United States Patent
Hoshino et al.

(10) Patent No.: US 9,405,403 B2
(45) Date of Patent: Aug. 2, 2016

(54) CONTROL APPARATUS, OPERATION CONTROLLING METHOD AND NON-TRANSITORY COMPUTER-READABLE STORAGE MEDIUM

(71) Applicant: Konica Minolta, Inc., Tokyo (JP)

(72) Inventors: Noriko Hoshino, Kokubunji (JP); Takao Shudo, Chofu (JP); Toshihiro Motoi, Tokyo (JP); Shinya Ogino, Machida (JP); Shunsuke Takamura, Tama (JP); Ikuko Kanazawa, Kunitachi (JP)

(73) Assignee: KONICA MINOLTA, INC., Tokyo (JP)

( * ) Notice: Subject to any disclaimer, the term of this patent is extended or adjusted under 35 U.S.C. 154(b) by 364 days.

(21) Appl. No.: 14/247,650

(22) Filed: Apr. 8, 2014

(65) Prior Publication Data

US 2014/0306907 A1 Oct. 16, 2014

(30) Foreign Application Priority Data

Apr. 10, 2013 (JP) ................. 2013-081834

(51) Int. Cl.
  *G06F 3/00* (2006.01)
  *G06F 3/041* (2006.01)
  *G06F 3/03* (2006.01)

(52) U.S. Cl.
  CPC ............ *G06F 3/0418* (2013.01); *G06F 3/0304* (2013.01)

(58) Field of Classification Search
  CPC ....... G06F 1/00; G06F 3/0488; G06F 3/0482; G06F 3/04842; G06F 3/04883; G06F 3/04886; G06F 3/04817; G09G 5/14; G09G 2330/021; G09G 2300/0842
  See application file for complete search history.

(56) References Cited

U.S. PATENT DOCUMENTS

2013/0154990 A1* 6/2013 Hamada ................... G09G 3/20
  345/173

FOREIGN PATENT DOCUMENTS

JP   05-100809 A    4/1993
JP   2000-227835    8/2000
(Continued)

OTHER PUBLICATIONS

Office Action dated Mar. 24, 2015 for the corresponding Japanese Patent Application No. 2013-081834.
(Continued)

*Primary Examiner* — Michael Faragalla
(74) *Attorney, Agent, or Firm* — Lucas & Mercanti, LLP

(57) ABSTRACT

Provided are a control apparatus, an operation controlling method and a non-transitory computer-readable storage medium storing an operation controlling program. The control apparatus is provided for controlling a display panel which allows an operator to give an instruction at an instruction position by performing a touch operation. The control apparatus includes: an instruction position setting section configured to set an instruction position based on a touch position; a mode determining section is configured to determine a mode for the instruction position setting, by defining a first area and a second area and choosing between a first mode to set the instruction position at the same position as the touch position and a second mode to set the instruction position at a position being away from the touch position, according to which of the first and second areas includes the touch position; and a processing section configured to execute the object processing according to the instruction position.

25 Claims, 13 Drawing Sheets

(56) References Cited

FOREIGN PATENT DOCUMENTS

| | | |
|---|---|---|
| JP | 2004-310351 | 11/2004 |
| JP | 2009-064209 A | 3/2009 |
| JP | 2009-087295 A | 4/2009 |

OTHER PUBLICATIONS

English translation of Office Action dated Mar. 24, 2015 for the corresponding Japanese Patent Application No. 2013-081834.

* cited by examiner

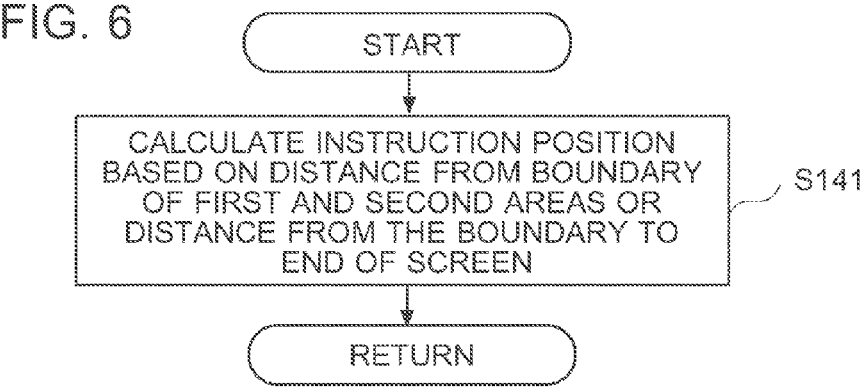
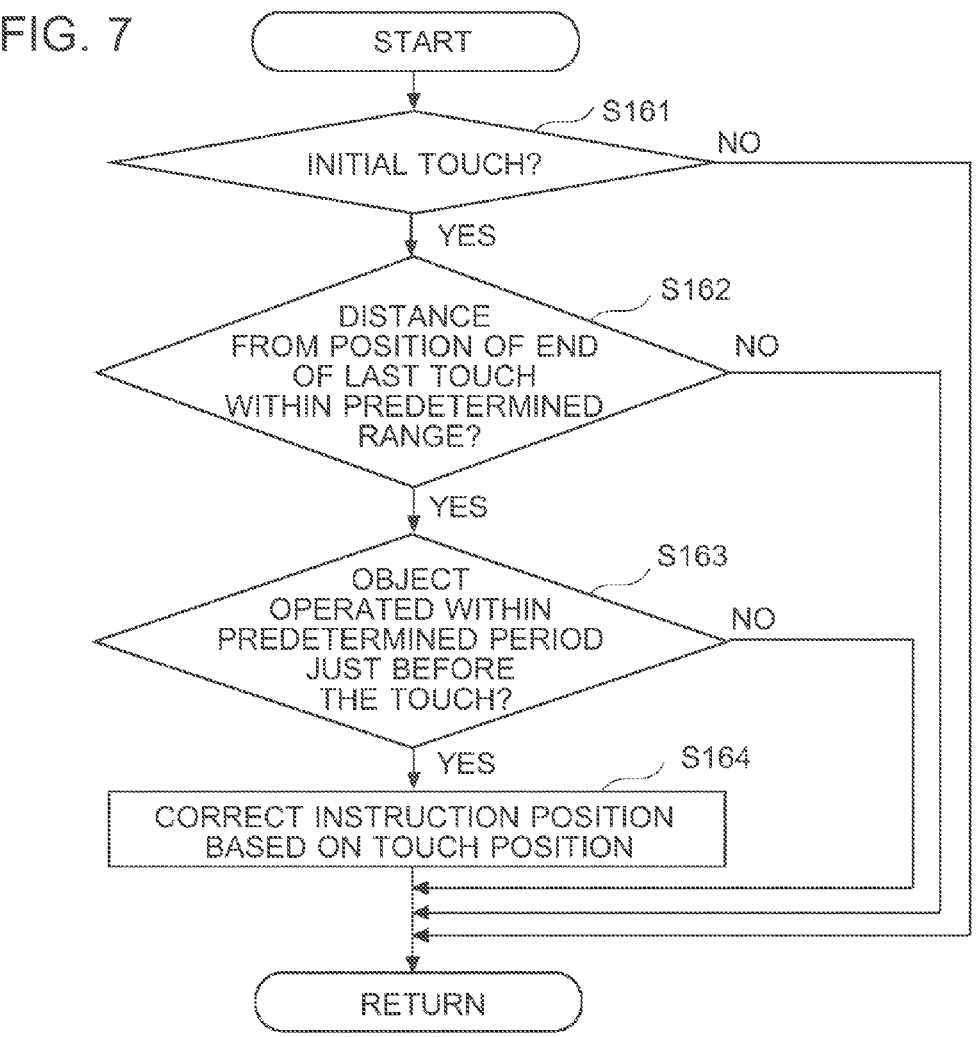

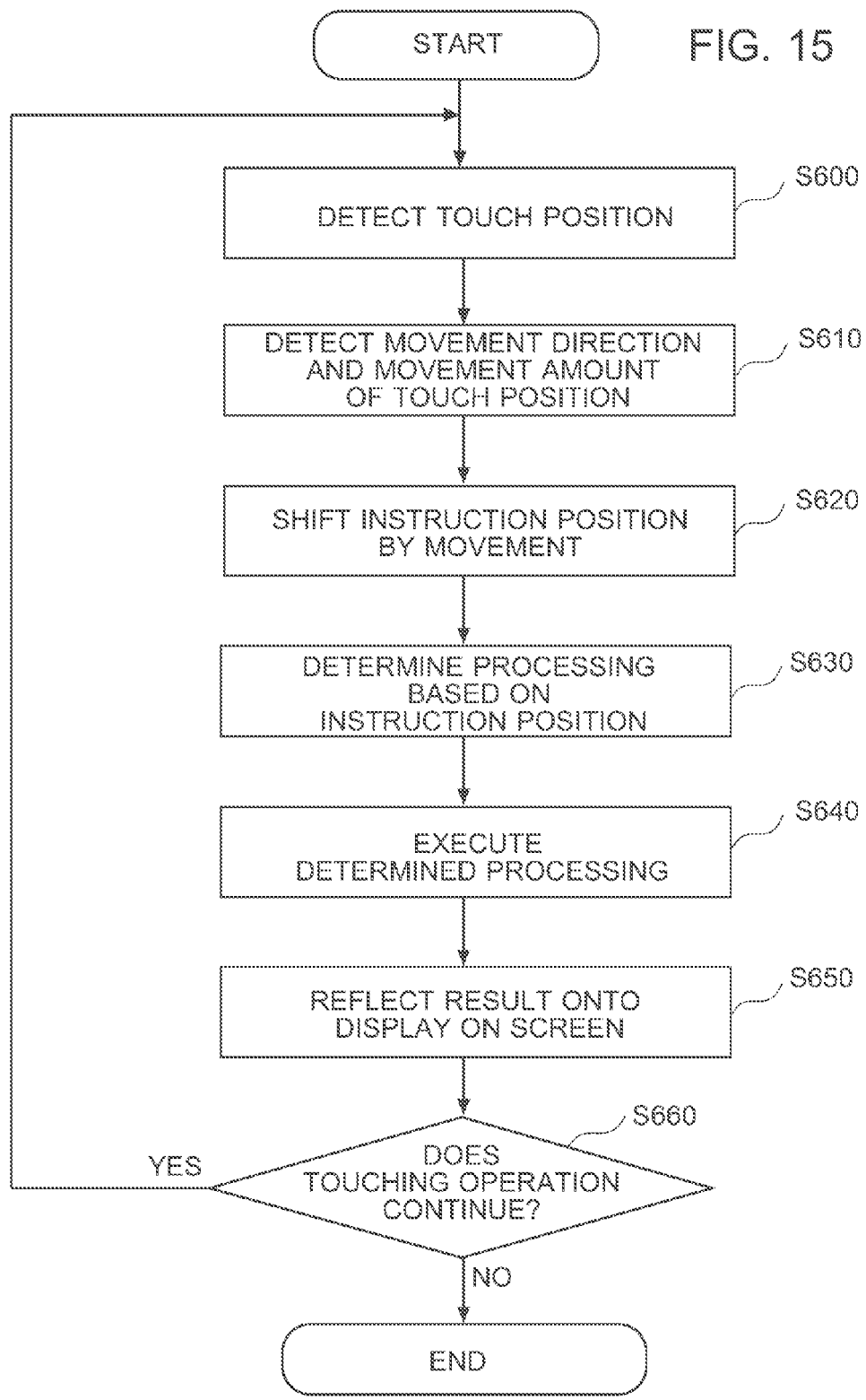

CONTROL APPARATUS, OPERATION CONTROLLING METHOD AND NON-TRANSITORY COMPUTER-READABLE STORAGE MEDIUM

This application is based on Japanese Patent Application No. 2013-081834 filed on Apr. 10, 2013, in the Japan Patent Office, the entire content of which is hereby incorporated by reference.

TECHNICAL FIELD

The present invention relates to a control apparatus, an operation controlling method and a non-transitory computer-readable storage medium storing an operation controlling program, and specifically relates to a control apparatus that controls a display panel which allows an operator to conduct an operation on a screen displayed thereon, an operation controlling method for controlling an operation to be conducted on a screen displayed on the display panel and a anon-transitory computer-readable storage medium storing an operation controlling program for the same.

BACKGROUND

In recent years, there has been increasingly proliferated such an electronic conference that employs a large-sized display equipped with a touch panel (hereinafter, referred to as a large-sized touch panel display), on which various kinds of objects are displayed so as to make it possible to proceed the electronic conference by operating each of the objects displayed thereon. With respect to the large-sized touch panel display as above-mentioned, since it is difficult for the operator (presenter) to operate the object that is displayed at a position located beyond the reach of the operator, various kinds of methods for assisting the operator's operations to be performed on the panel have been proposed so far.

For instance, Japanese Patent Application Laid-Open Publication (JP-A) No. 2009-064209 sets forth such a display operation apparatus that has a display screen provided with a touch sensor so as to make it possible to operate the display screen through touch operating actions of the operator, and in the display operation apparatus above-mentioned, a small screen area, within which a minified image of the image displayed on the whole screen area is to be displayed, is established, and a touch operating action to be performed at a hand-unreachable position on the display screen is replaced with another touch operation performed on the small screen area by converting the touch operating position in the small screen area to the other corresponding position on the whole display screen, so as to enable an operation for remotely controlling the whole display screen through the touch operating action performed within the small screen area.

Further, JP-A No. 2009-087295 sets forth such another display operation apparatus that has a display screen provided with a touch sensor so as to make it possible to operate the display screen through touch operating actions of the operator, and in the display operation apparatus above-mentioned, the display screen is equally divided in both horizontal and vertical directions into divided images and a sub-screen area, on which each of the divided images displayed on the display screen is to be displayed, is established, and a touch operating action to be performed at a hand-unreachable position on the display screen is replaced with another touch operation performed on the sub-screen area by converting the touch operating position in the sub-screen area to the other corresponding position on the whole display screen, so as to enable an operation for remotely controlling the whole display screen through the touch operating actions performed within the sub-screen area.

As described in JP-A Nos. 2009-064209 and 2009-087295, it is possible to provide an operation use screen, such as the small screen area exemplified in JP-A No. 2009-064209, the sub-screen area exemplified in JP-A No. 2009-087295, or the like, in a part of the whole display screen in which an object is to be displayed, in order to make it possible to operate any one of objects currently displayed within an object display area by performing operating actions on the operation use screen.

However, according to the methods above-mentioned, since the controlling mode in the apparatus side changes between such a case that the operator touches the object display area and another case that the operator touches the operation use screen, it should be necessary for the operator to intentionally discriminate an operating action to be performed in a hand-reachable area and another operating action to be performed in a hand-unreachable area from each other. As a result, there has arisen such a problem that the operator's operations become cumbersome and it is difficult for the operator to concentrate the operation of the display concerned. The present invention seeks to solve the problem.

SUMMARY

There are disclosed illustrative control apparatuses, operation controlling methods and non-transitory computer-readable storage media each storing an operation controlling program.

An illustrative control apparatus reflecting one aspect of the present invention is a control apparatus for controlling a display panel. The display panel allows an operator to give an instruction for object processing at an instruction position in an object display area of the display panel by performing a touch operation in the object display area. The control apparatus comprises: an instruction position setting section configured to perform setting an instruction position of an instruction for object processing given by an operator, based on a touch position where a touch operation has been performed in the object display area, where the setting the instruction position includes setting the instruction position at one of a same position as the touch position and a position being apart from the touch position. The control apparatus further comprises a mode determining section configured to perform determining a mode for setting the instruction position. The determining the mode includes defining a first area covering a predetermined range in the object display area and a second area surrounding the first area, and choosing between a first mode to set the instruction position at the same position as the touch position and a second mode to set the instruction position at a position being away from the touch position, according to which of the first area and the second area includes the touch position, where the first area is an area where the instruction position is set at the first mode, and the second area is an area where the instruction position is set at the second mode. The control apparatus further comprises a processing section configured to execute the object processing according to the instruction position.

An illustrative operation controlling method reflecting one aspect of the present invention is an operation controlling method of a control apparatus for controlling a display panel. The display panel allows an operator to give an instruction for object processing at an instruction position in an object display area of the display panel by performing a touch operation in the object display area. The method comprises setting an instruction position of an instruction for object processing given by an operator, based on a touch position where a touch operation has been performed in the object display area, where the setting the instruction position includes setting the instruction position to one of a same position as the touch position and a position being apart from the touch position. The method further comprises determining a mode for setting the instruction position. The determining the mode includes defining a first area covering a predetermined range in the object display area and a second area surrounding the first area and choosing between a first mode to set the instruction position to the same position as the touch position and a second mode to set the instruction position to a position being away from the touch position, according to which of the first area and the second area includes the touch position, where the first area is an area where the instruction position is set at the first mode, and the second area is an area where the instruction position is set at the second mode. The method further comprises executing the object processing according to the instruction position.

An illustrative non-transitory computer-readable storage medium reflecting one aspect of the present invention stores an operation controlling program to be executed in a control apparatus capable of controlling a display panel. The display panel allows an operator to give an instruction for object processing at an instruction position in an object display area of the display panel by performing a touch operation in the object display area. The operation controlling program, when being executed by a processor of the control apparatus, causes the control apparatus to perform the above-described operation controlling method.

Other features of illustrative embodiments will be described below.

BRIEF DESCRIPTION OF THE DRAWINGS

Embodiments will now be described, by way of example only with reference to the accompanying drawings which are meant to be exemplary, not limiting, and wherein like elements numbered alike in several figures, in which:

FIG. 6 is a flowchart indicating an instruction-position calculation processing based on a touch position included in the processing shown in FIG. 3;

FIG. 7 is a flowchart indicating a position correction processing of a consecutive operation object included in the processing shown in FIG. 3;

Figure 8A:
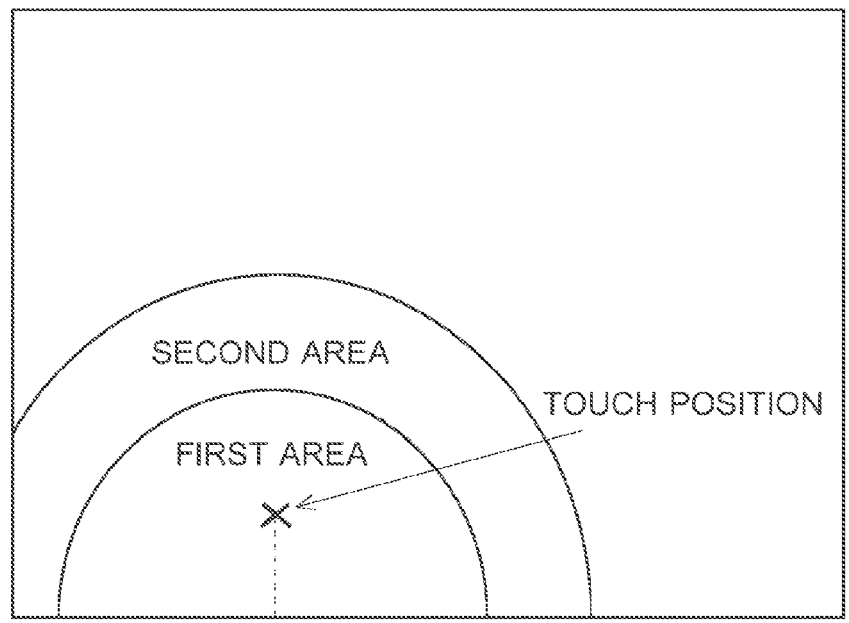
Figure 8B:
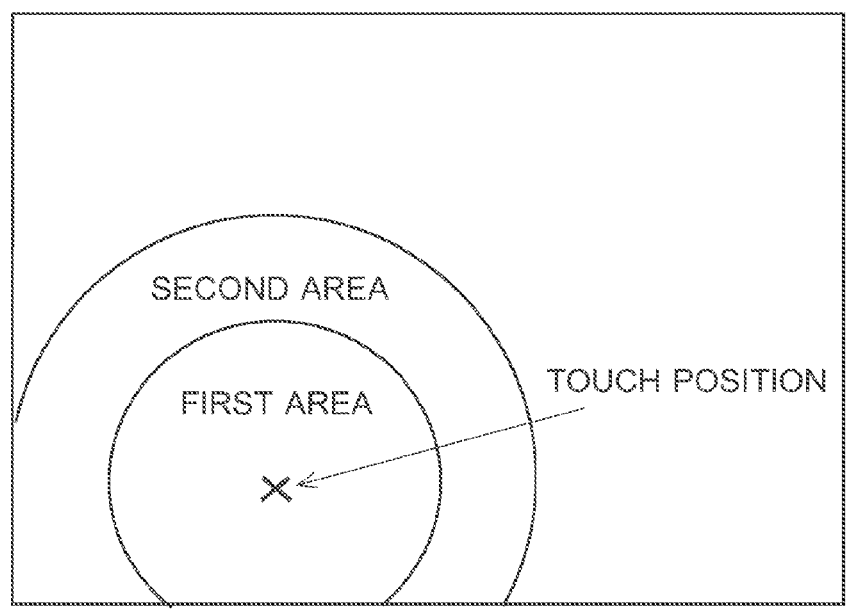
Figure 9A:
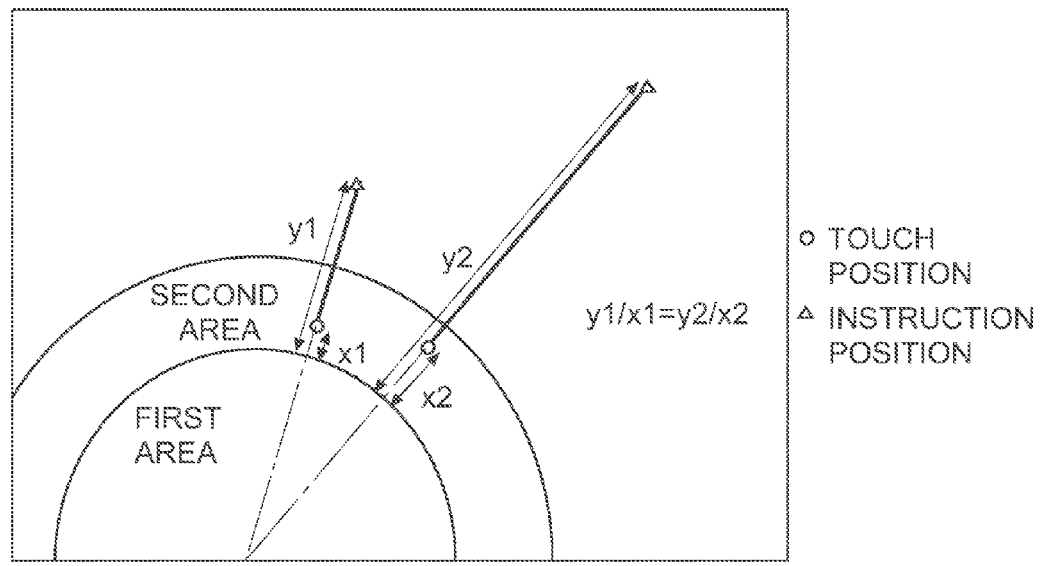
Figure 9B:
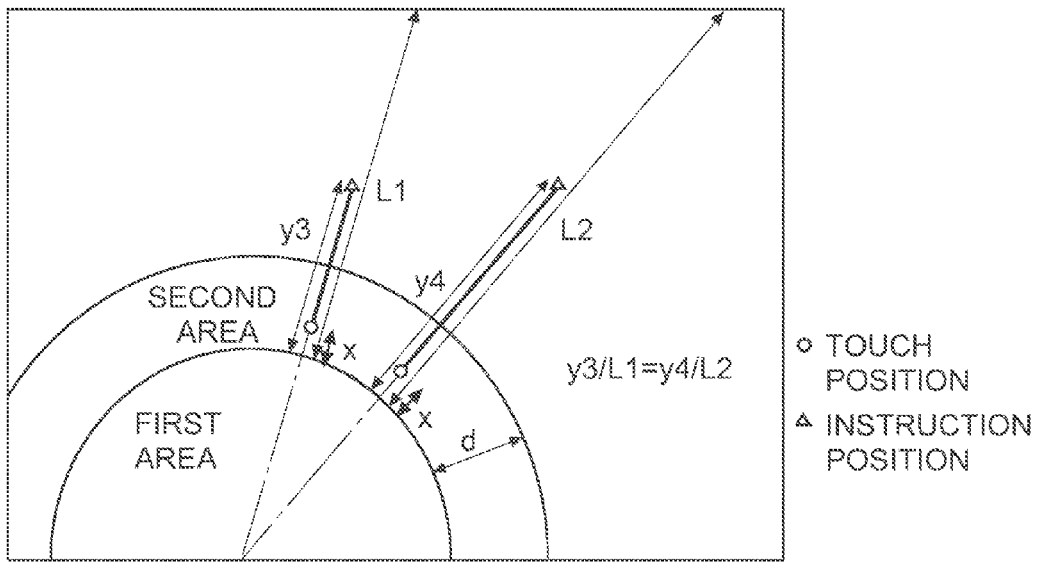
Figure 10A:
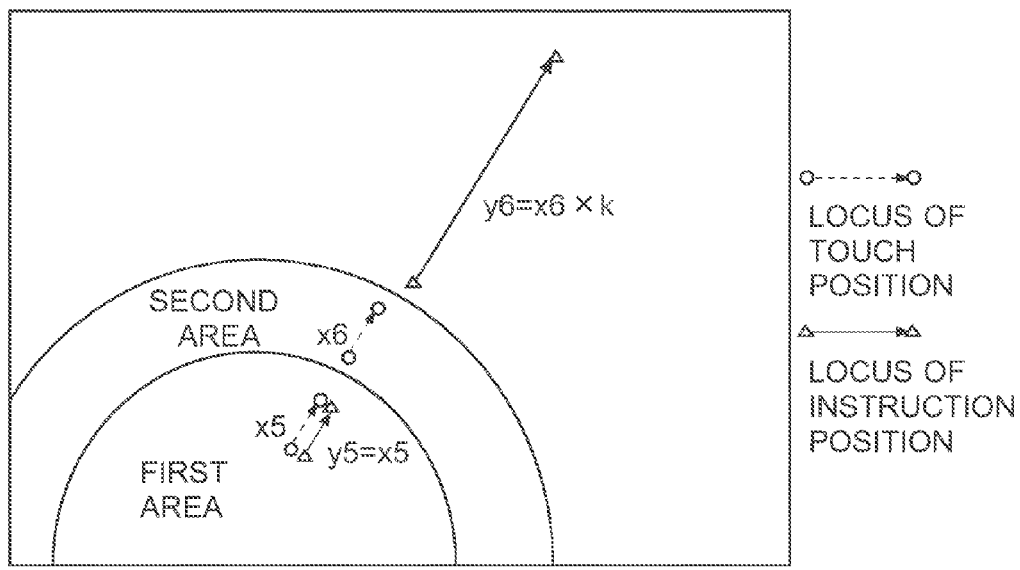
Figure 10B:
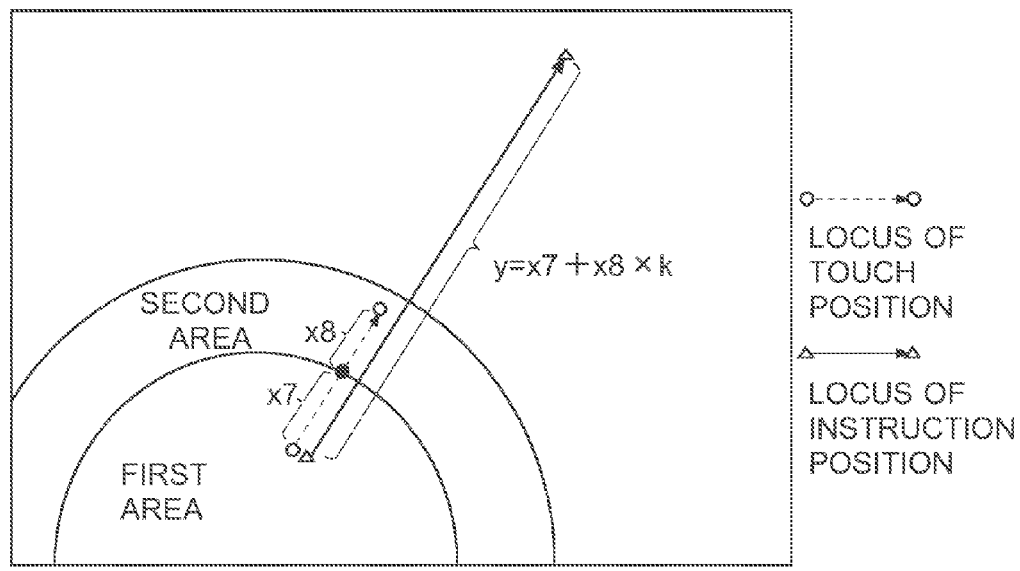
Figure 11:
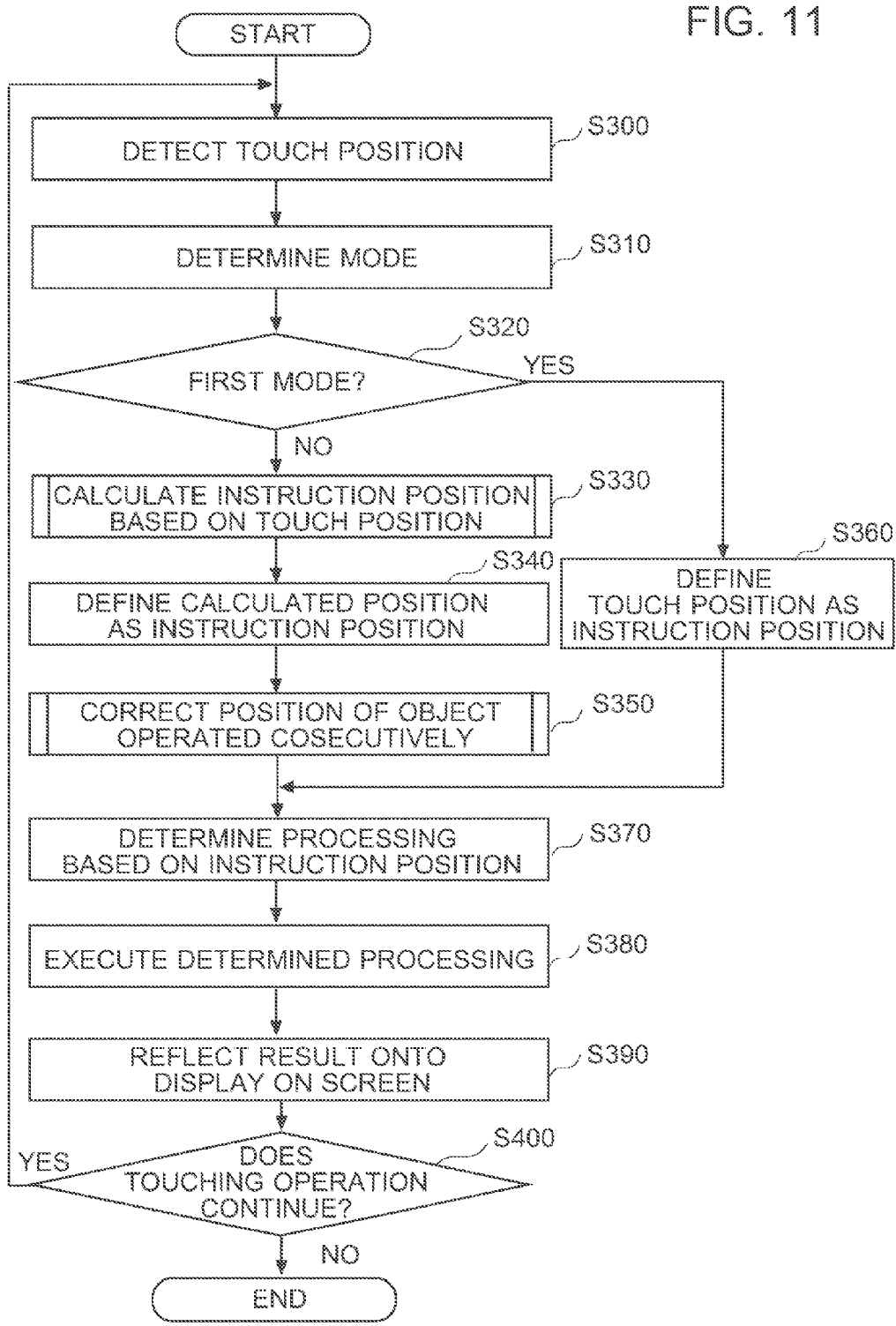
Figure 12:
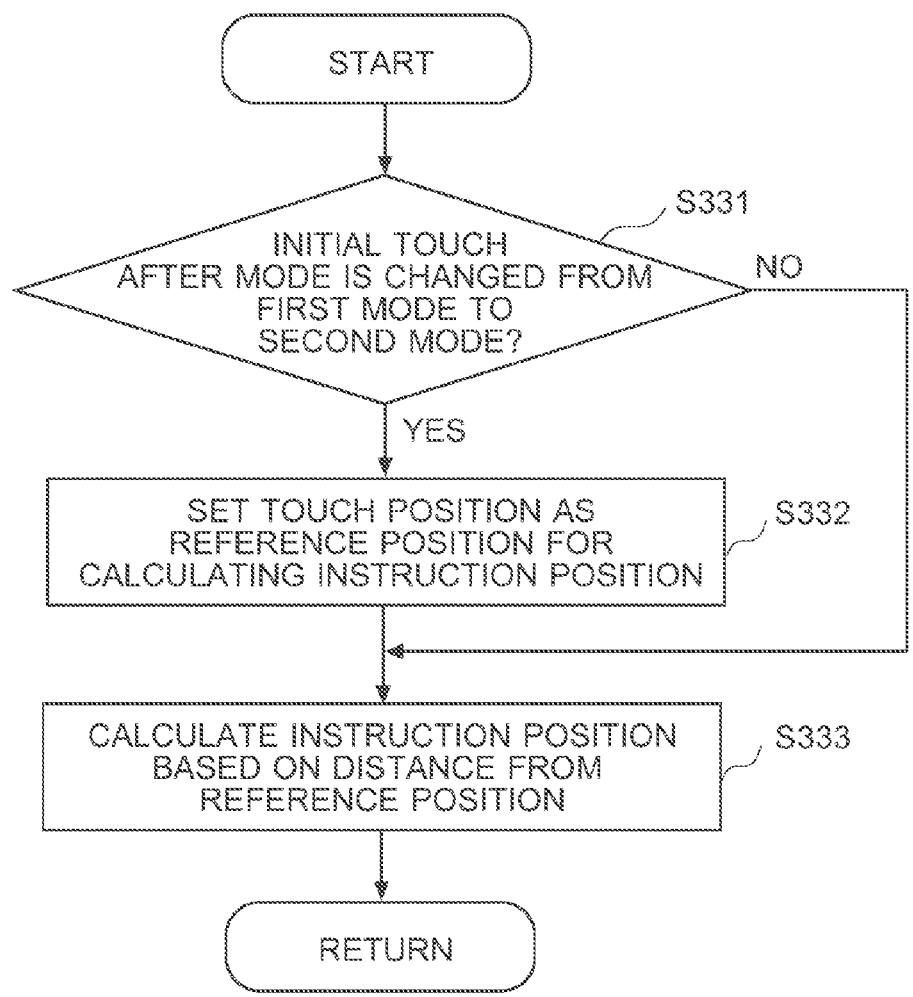
Figure 13A:
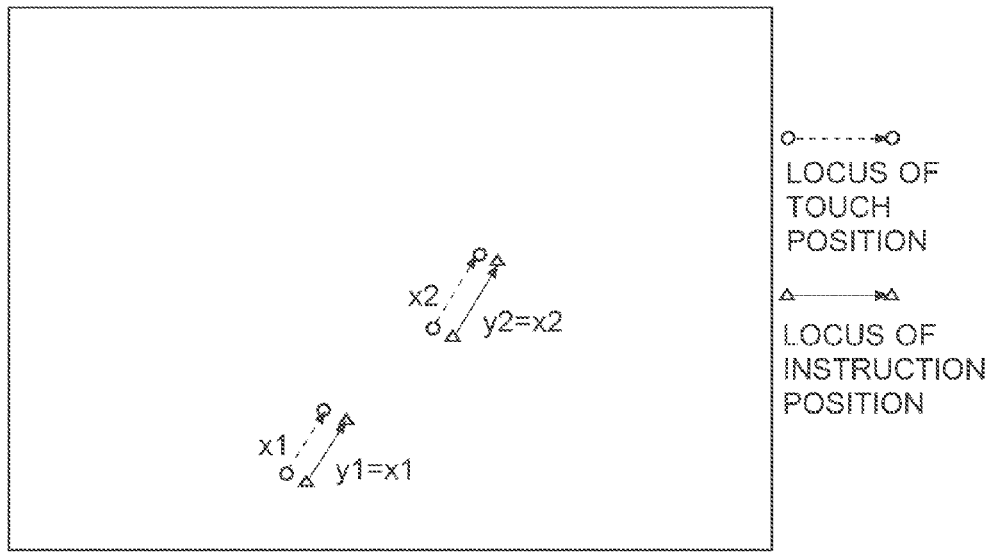
Figure 13B:
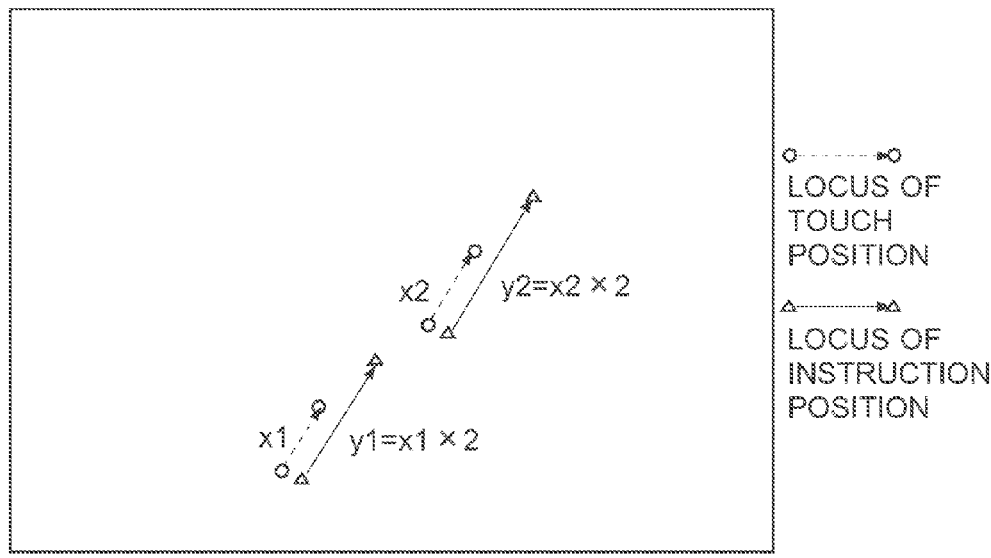
Figure 14:
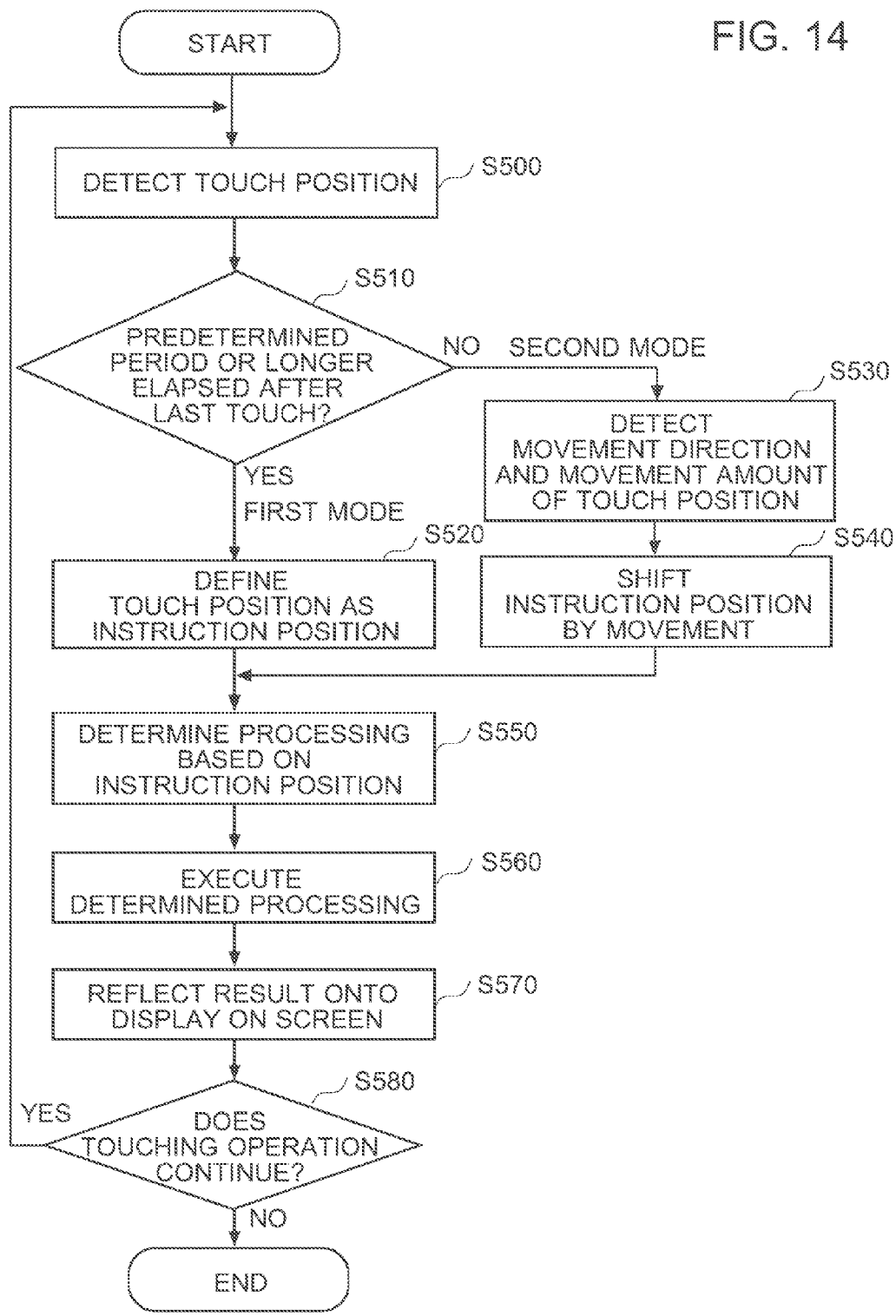
Figure 16A:
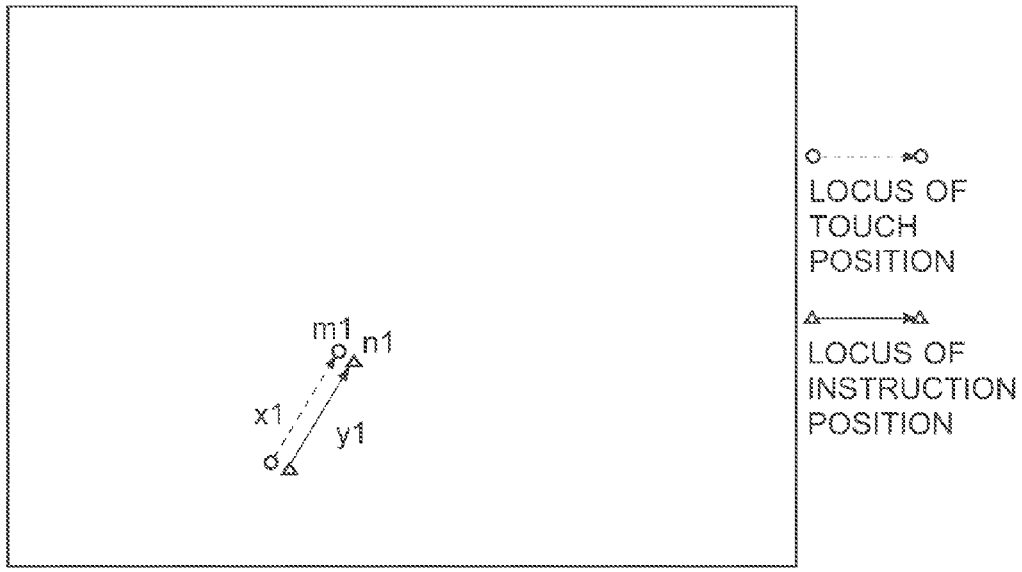
Figure 16B:
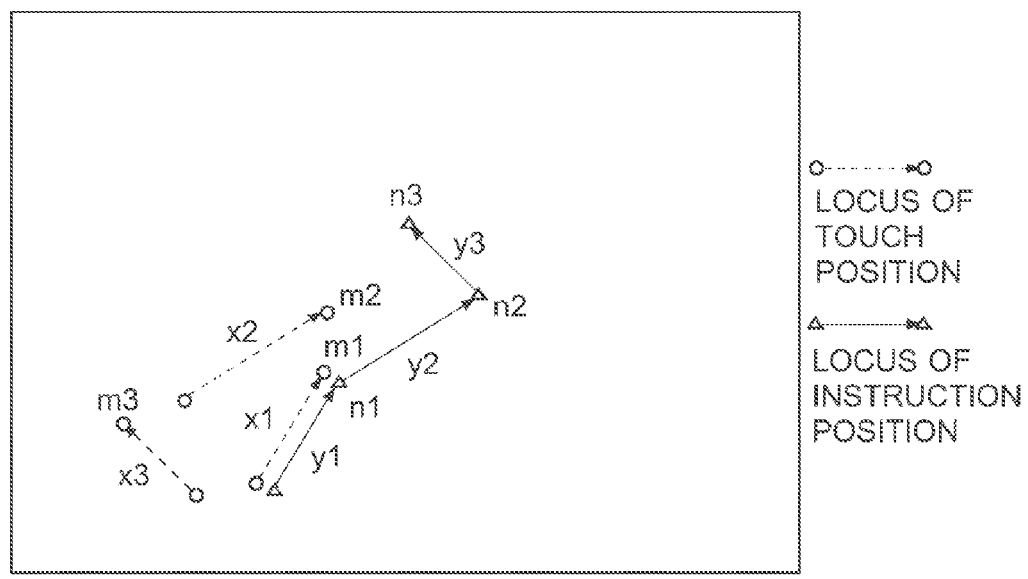

Each of FIGS. 8A and 8B is an explanatory schematic diagram for explaining a method of an area definition operation based on a touch position in accordance with Example 1 of the present invention;

Each of FIGS. 9A and 9B is an explanatory schematic diagram for explaining a method for calculating an instruction position in accordance with Example 1 of the present invention;

Each of FIGS. 10A and 10B is an explanatory schematic diagram for explaining a relationship between a touch position and an instruction position in accordance with Example 1 of the present invention;

FIG. 11 is a flowchart indicating processing (touch detection processing) to be performed by a control apparatus in accordance with Example 2 of the present invention;

FIG. 12 is a flowchart indicating an instruction-position calculation processing based on a touch position included in the processing shown in FIG. 11;

Each of FIGS. 13A and 13B is an explanatory schematic diagram for explaining a relationship between a touch position and an instruction position in accordance with Example 2 of the present invention;

FIG. 14 is a flowchart indicating processing (touch detection processing) to be performed by a control apparatus in accordance with Example 3 of the present invention;

FIG. 15 is a flowchart indicating processing (another example of a touch detection processing) to be performed by a control apparatus in accordance with Example 3 of the present invention; and Each of FIGS. 16A and 16B is an explanatory schematic diagram for explaining a relationship between a touch position and an instruction position in accordance with Example 3 of the present invention.

DETAILED DESCRIPTION

Illustrative embodiments of control apparatuses, operation controlling methods and non-transitory computer-readable storage media each storing an operation controlling program will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

According to control apparatuses, operation controlling methods and non-transitory computer-readable storage media each storing an operation controlling program as embodiments of the present invention, by making it possible to instruct a system to apply a processing, which corresponds to a user's touch operation, to an object displayed at a position being apart from the touched position of the user's touch operation, it becomes possible for the user to operate an object located anywhere within an object display area only by performing an operation onto the object display area without providing an operating use screen exclusively and separately.

As described in the descriptions about the background, there has been increasingly proliferated such an electronic conference that employs a large-sized touch panel display on which various kinds of objects are displayed so as to make it possible to proceed the electronic conference by operating each of the objects displayed thereon. With respect to the large-sized touch panel display as above-mentioned, since it is difficult for an operator to operate the object that is displayed at a position located beyond the reach of the operator, the method for displaying the minified image of the whole display screen at a hand-reachable position so as to make the operator's operation possible (set forth in JP-A No. 2009-064209) and the other method for displaying one of the divided areas, which is located at a hand-unreachable position, at a hand-reachable position, so as to make the operator's operation possible (set forth in JP-A No. 2009-087295) have been proposed so far. However, according to the methods above-mentioned, it should be necessary for the operator to intentionally discriminate an operating action to be performed in a hand-reachable area and another operating action to be performed in a hand-unreachable area from each other. Accordingly, there has arisen such a problem that the operator's operations become cumbersome, and as a result, it is difficult for the operator to concentrate his attention to the operations to be performed on the display concerned.

To overcome such the problem as above-mentioned, an embodiment in accordance with the present invention is provided with a first mode, in which an instruction position is set at a touch position as it is, and a second mode, in which an instruction position is set at a position being apart from a touch position, so as to make it possible for the operator to operate any one of the objects currently displayed in the object display area, by changing the operating mode from the first mode to the second mode or vice versa, even if the operator performs operations merely within the operator's hand-reachable range.

In order to achieve the control operations above-mentioned, according to the first method in accordance with a first embodiment of the present invention, a first area and a second area that surrounds the first area are provided within the operator's hand-reachable range, so as to change the first mode to the second mode or vice versa, according which area includes a currently-touch position. Further, according to the second method in accordance with a second embodiment of the present invention, with respect to allover the object display area, the first mode is changed to the second mode or vice versa, corresponding to an instruction inputted by the operator. Still further, according to the third method in accordance with a third embodiment of the present invention, when plural movements of a touch position have been performed, the instruction position is determined by reflecting the plural movements.

According to each of the methods as above-mentioned, the operator's operation, performed directly onto the object display area, makes it possible to operate even such an object that is located within the hand-unreachable area, and as a result, it is possible to drastically improve the operability thereof. Further, according to the first method, since the first area and the second area are continuously connected to each other, it becomes possible for the operator to perform operations onto the screen in a seamless manner. Still further, according to the second method, since the first mode and the second mode are changeable therebetween, it becomes possible for the operator to operate an object, located at a position within the hand-unreachable area, without impeding the operability of another object located at another position within the hand-reachable area. Yet further, according to the third method, it becomes possible for the operator to perform the operations in such a manner as if he were using a mouse.

Example 1

Figure 1:
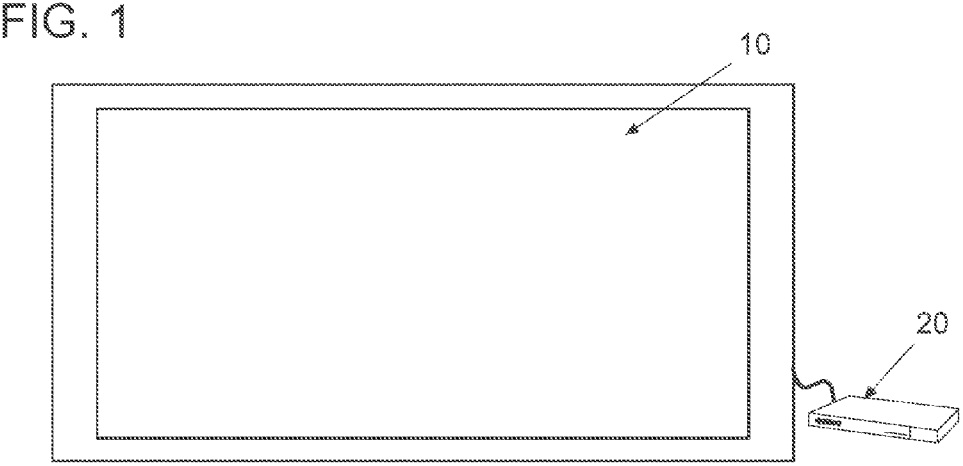
FIG. 1 is a schematic diagram showing an outer appearance of an operation controlling system in accordance with Example 1 of the present invention.
Figure 2:
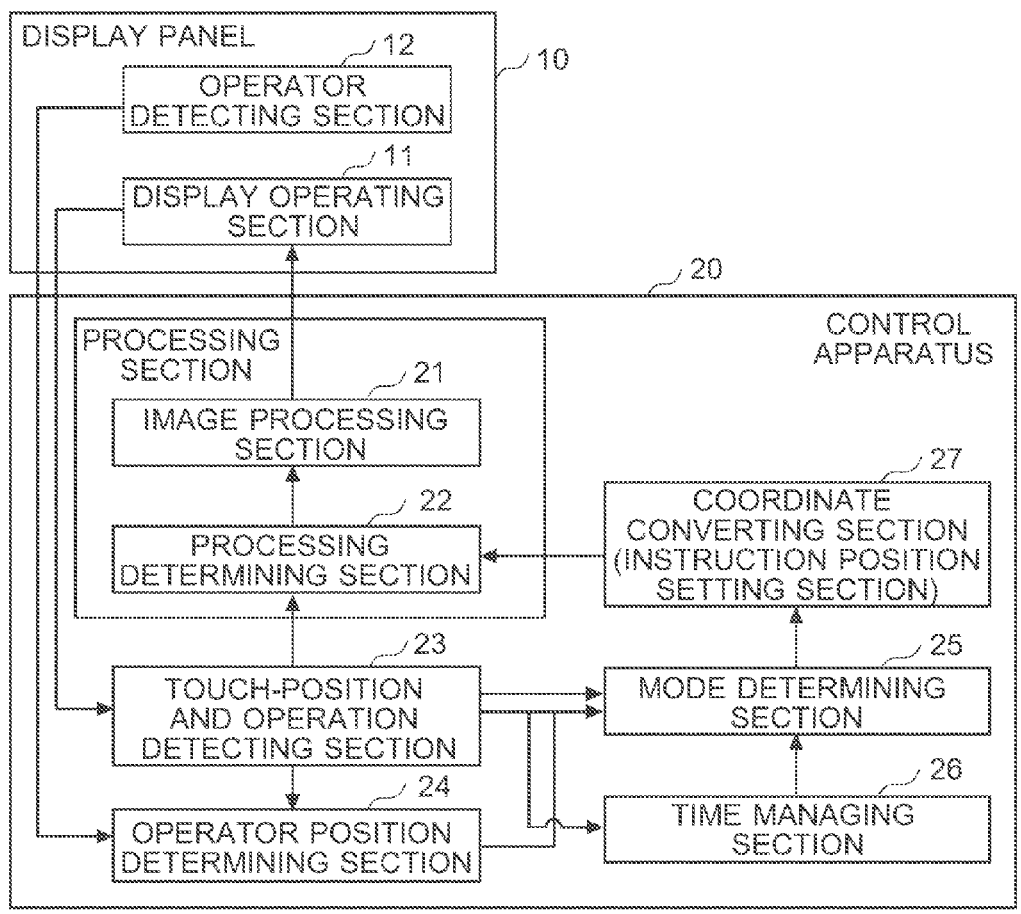
FIG. 2 is a block diagram indicating a configuration of each of apparatuses provided in an operation controlling system in accordance with Example 1 of the present invention.

In order to describe the aforementioned embodiments of the present invention in detail, referring to FIG. 1 through FIG. 10B, a control apparatus, an operation controlling method and a non-transitory computer-readable storage medium storing an operation controlling program as embodiments of the present invention, will be detailed in the following. FIG. 1 is a schematic diagram showing an outer appearance of an operation controlling system in accordance with the present example, FIG. 2 is a block diagram indicating a configuration of each of apparatuses provided in the operation controlling system in accordance with the present example and FIG. 3 through. FIG. 7 are flowcharts indicating various kinds of processing to be implemented by a controlling apparatus in accordance with the present example. Further, each of FIGS. 8A and 8B is an explanatory schematic diagram for explaining a method of an area definition operation. Each of FIGS. 9A and 9B is an explanatory schematic diagram for explaining a method for calculating an instruction position and Each of FIGS. 10A and 10B is an explanatory schematic diagram for explaining a relationship between a touch position and an instruction position.

As indicated in the schematic diagram shown in FIG. 1, an operation control system in accordance with the present example is constituted by a display panel 10, on which an object can be displayed and operations onto a screen can be performed, and a control apparatus 20. Further, the display panel 10 and the control apparatus 20 are coupled to each other through a wired or wireless communication link. In this connection, although the display panel 10 and the control apparatus 20 are indicated as the apparatuses being separate from each other in the schematic diagram shown in FIG. 1, the display panel 10 and the control apparatus 20 may be integrated as a single apparatus (for instance, such a configuration in which the control apparatus 20 is accommodated into an inner space of the display panel 10 may be also applicable).

FIG. 2 is a block diagram showing configurations of each of the apparatuses included in the operation control system above-mentioned. Each of the apparatuses will be detailed in the following.

Display Panel:

The display panel 10 is such an apparatus that is used by the operator for viewing and operating an object displayed thereon (giving an instruction for object processing), and provided with a display operating section 11 and an operator detecting section 12 as needed.

The display operating section 11 is provided with an operation section, such as a pressure sensitive touch sensor in which transparent electrodes are arranged in a lattice pattern, an electrostatic-capacity sensitive touch sensor, etc., which is mounted (laminated) over an LCD (Liquid Crystal Display) or an organic EL (Electro-Luminescence) display. Further, the display operating section 11 displays an object according to the instruction command signal issued by the control apparatus 20 (namely, all-over the screen of the display section serves as an object display area) and, at the same time, transmits the signals, detected and outputted by the touch sensor (namely, the signals represent the coordinate values of the touch position on the object display area), to the control apparatus 20.

The operator detecting section 12 serves as a device that detects an existence of an operator who operates the display operating section 11 (for instance, a Kinect sensor), and may be any one of devices, including: an image capturing device that captures a human portrait by using a camera, etc.; a device that detects light reflected from a physical object (or infrared ray irradiated form a physical object) by employing a photo-sensor; a device that detects a sound wave reflected from a physical object by employing a sound wave sensor; a device that detects an IC tag by employing the NFC (Near Field Communication) technology, etc.

In the case of the image capturing device, a portrait of the operator who currently faces the display operating section 11 is captured by the image capturing device mounted on a predetermined position (for instance, located above an upper frame of the display panel 10, or the like), and then, the image data, representing the captured portrait of the operator, is transmitted to the control apparatus 20. Further, in the case of any one of the other kinds of detecting devices, a plurality of the concerned devices is arranged along a predetermined place (for instance, located below a lower frame of the display panel 10, or the like), so that one of the concerned devices, which is disposed at a position corresponding to the operator who currently faces the display operating section 11, detects a light, a sound wave or an electro-magnetic wave, and then, the detected signal is transmitted to the control apparatus 20.

Control Apparatus:

The control apparatus 20 includes a controlling section that is constituted by a CPU (Central Processing Unit) and various kinds of storage devices, including a ROM (Read Only Memory), a RAM (Random Access Memory), an HDD (Hard Disc Drive), etc., so that the controlling section controls various kinds of operations to be performed by the display panel 10 and the control apparatus 20. The controlling section functionally serves as an image processing section 21, a processing determining section 22, a touch-position and operation detecting section 23, an operator position determining section 24, a mode determining section 25, a time managing section 26, a coordinate converting section (instruction position setting section) 27, etc.

The image processing section 21 and the processing determining section 22 works as a processing section configured to execute the object processing according to the instruction position.

The image processing section 21 is configured to, based on the instruction received from the processing determining section 22, update the display position and/or the display mode. The image processing section 21 is configured to create image data representing an updated display image after the operation for updating the display position and/or the display mode has been completed, and to transmit the image data representing an updated display image to the display operating section 11.

The processing determining section 22 is configured to reflect the operation, detected by the touch-position and operation detecting section 23, onto the position that is defined (set) on the basis of the touch position by the coordinate converting section 27 (hereinafter, referred to as en instruction position), and notify the image processing section 21 of the reflected result (for instance, an instruction for moving the object to the instruction position).

The touch-position and operation detecting section 23 is configured to, based on the signals transmitted from the display operating section 11 provided on the display panel 10, detect the touch position on the screen, in order to notify the sections, including the operator position determining section 24, the mode determining section 25 and the time managing section 26, of the touch position above-detected. In addition, the touch-position and operation detecting section 23 is configured to detect a kind of the operation from the touch position and the changing mode thereof, in order to notify the processing determining section 22 of the detected kind of the operation concerned. For instance, when the touch position moves, the kind of operation is determined as such the operation for moving the instruction position (cursor) or the object.

The operator position determining section 24 is configured to, based on the touch position notified by the touch-position and operation detecting section 23 (for example, based on a touch position at which a predetermined touch operation has been performed), determine the current position of the operator relative to the screen of the display operating section 11, in order to notify the mode determining section 25 of the operator's position above-determined. Further, the operator position determining section 24 is configured to, based on the image data and the signals transmitted from the operator detecting section 12 of the display panel 10, determine the current position of the operator relative to the screen of the display operating section 11, in order to notify the mode determining section 25 of the operator's position above-determined. For instance, in a case where an image captured by a camera is to he utilized, the image analysis processing, which employs the publicly well-known pattern recognition technique, is applied to image data representing the image, so as to extract a personal figure from the image concerned, and then, based on the position of the personal figure in the image, the camera mounted position and the image capturing direction, the operator's position relative to the screen, provided in the display operating section 11, is determined.

The mode determining section 25 is configured to, based on the operator's position notified by the operator position determining section 24, define a first area and a second area. For instance, with reference to the operator's position above-notified, the mode determining section 25 specifies an operator hand-reachable range (for instance, a range calculated from the positions of both the shoulders and the length of an arm of the operator concerned), and defines a predetermined range in the vicinity of the operator's position as the first area (same magnification area), while defines a specific range, which is located outside and surrounding the first area and within the operator hand-reachable range, as the second area (variable magnification area). The mode determining section 25 is further configured to determine whether the touch position, notified by the touch-position and operation detecting section 23, is included in the first area or the second area, to choose the operation mode. When determining that the touch position is included in the first area, the mode determining section 25 sets the operating mode, which specifies the relationship between the touch position and the instruction position, at the first mode, while when determining that the touch position is included in the second area, sets the operating mode at the second mode, and notifies the coordinate converting section 27 of the touch position and the operating mode above-determined.

The time managing section 26, serving as a timer or the like, is configured to manage the duration time (touch interval time) that has elapsed since the operator touched the screen of the display operating section 11, in order to notify the mode determining section 25 of the touch interval time. The touch interval time, above-mentioned, is utilized for an area definition processing and a position correction processing of the object, both of which are to be implemented by the mode determining section 25 and detailed later.

The coordinate converting section (instruction position setting section) 27 is configured to, according to the operation mode set by the mode determining section 25, calculate an instruction position based on a touch position, in order to notify the processing determining section 22 of the instruction position above-calculated. For instance, in a case where the operating mode is set at the first mode (touch position resides within the first area), the instruction position is set at the touch position as it is, in a case where the operating mode is set at the second mode (touch position resides within the second area), the instruction position is set at a position being away from the touch position, for example, the touch position is shifted (coordinate conversion processing is applied thereto) in a direction being apart from the operator's position (in a direction from towards the end of the screen) so as to set the instruction position at a position acquired by applying the coordinate conversion processing (hereinafter, referred to as a coordinate converted position). The above-method for determining the instruction position at the second mode will be detailed later on.

In this connection, each of the above-mentioned sections, including the image processing section 21, the touch-position and operation detecting section 23, the operator position determining section 24, the mode determining section 25, the time managing section 26 and the coordinate converting section 27, may be configured as either hardware or software (operation controlling program) to be executed by the CPU provided in the control apparatus 20.

Next, referring to the flowcharts shown in FIGS. 3 through 7, the touch detection processing to be conducted in the operation control system (control apparatus 20) above-configured will be detailed in the following. In this connection, the CPU provided in the control apparatus 20 executes the operation controlling program stored in the ROM so as to actually implement the touch detection processing.

Initially, based on the signals received from the touch sensor of the display operating section 11 provided in the display panel 10, the touch-position and operation detecting section 23 detects a touch position (coordinate values) at which the operator touched the display operating section 11 (Step S100).

Successively, the mode determining section 25 applies the area definition processing to the screen of the display operating section 11 (object display area) (Step S110). The screen of the display operating section 11 is categorized into an operator's hand-reachable range and an operator's hand-unreachable range, and as shown in FIGS. 8A and 8B, the operator's hand-reachable range includes: the first area (area of the first mode) in which the instruction position is set at the touch position as it is; and the second area (area of the second mode) in which the touch position moves towards the end of the object display area according to the predetermined rule and the instruction position is set at the moved position. It is desirable that the mode determining section 25 operates the display panel 10 to display at least one of the first area and the second area in the screen of the display operating section 11 (object display area) discernibly, for example, a display mode (for instance, a color displaying mode) of at least one of the first area and the second area is changed from the other area, and/or a border line for dividing the first area and the second area from each other is depicted therebetween, so as to make it possible for the operator to discern at least one of those areas. Further, it is unnecessary to strictly specify the hand-reachable range and the hand-unreachable range. Those ranges as above-mentioned may be changeable as needed, depending on the screen size of the display operating section 11 and/or the physical figure data of the operator (such as a body height, a shoulder width, an arm length, etc.).

Figure 4:
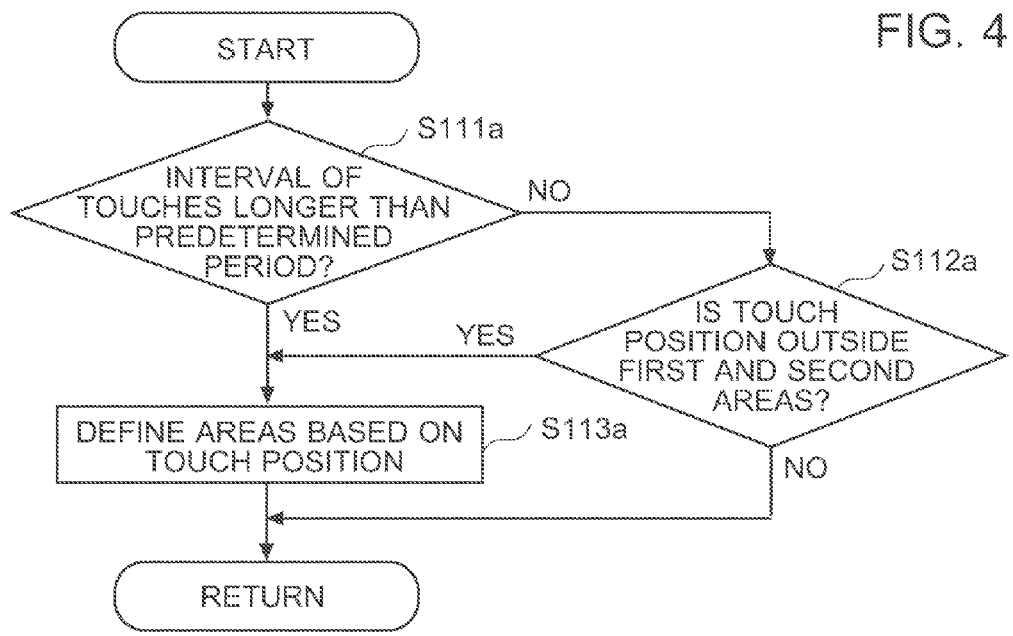
FIG. 4 is a flowchart indicating an area definition operation included in the processing shown in FIG. 3.
Figure 5:
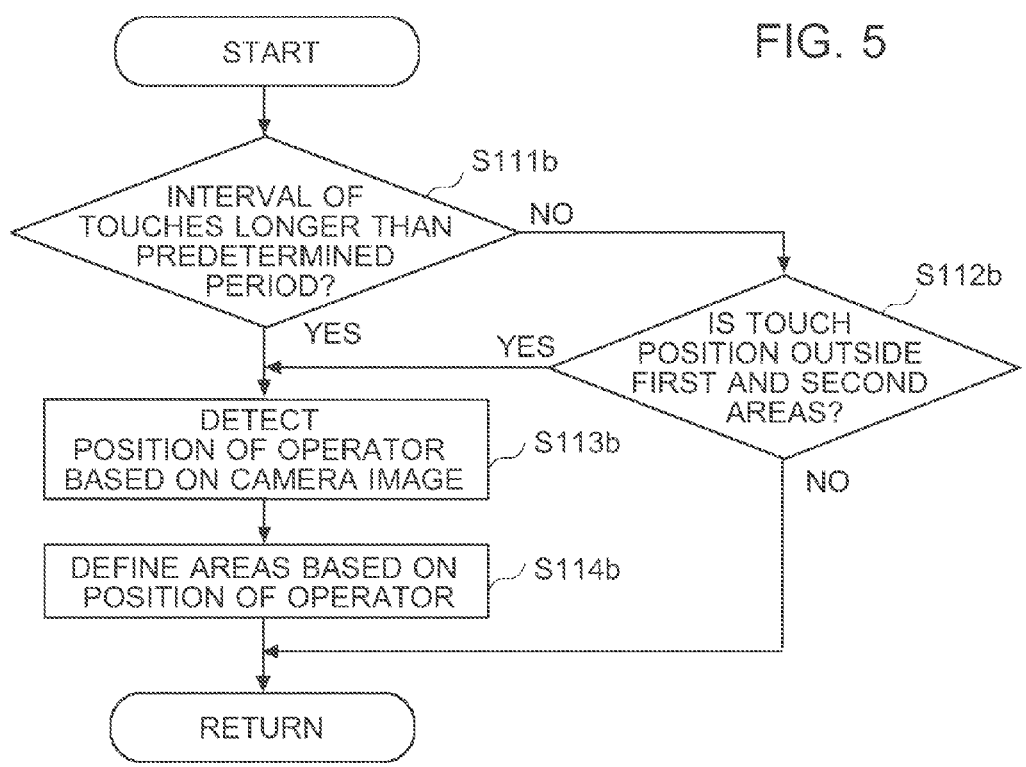
FIG. 5 is a flowchart indicating another example of an area definition operation included in the processing shown in FIG. 3.

FIGS. 4 and 5 are flowcharts showing detailed flows of the area definition processing, and specifically, FIG. 4 shows a flow in the case where the area definition processing is performed on the basis of the signals sent from the display operating section 11, while FIG. 5 shows a flow in the case where the area definition processing is performed on the basis of the signals sent from the operator detecting section 12 (herein, a camera). Each of the above-mentioned cases will be detailed in the following.

<In Case where Area Definition Processing is Performed, Based on Signals Sent from Display Operating Section 11>

As shown in FIG. 4, the mode determining section 25 acquires the touch interval time from the time managing section 26, and determines whether or not the touch interval time is equal to or longer than a predetermined time period established in advance (Step S111a). When determining that the touch interval time is equal to or greater than the predetermined time period (Step S111a; YES), the mode determining section 25 determines that the touch operation concerned is an instruction for defining areas for a new operation (namely, the current action is nothing to do with the previous action), and defines areas based on the touch position (Step S113a).

Concretely speaking, as shown in FIG. 8A, determining that the touch position is located at the center position in front of the operator, the mode determining section 25 establishes a semicircle with a first radius, which is centered at a reference point located at the lower side line of the display operating section 11 corresponding to the touch position, as a border line of the first area, while establishes another semicircle with a second radius, which is centered at the reference point and is greater than the first radius, as anther border line of the second area. Alternatively, as shown in FIG. 8B, it is also applicable that a circle with a first radius, which is centered at the touch position, is established as a border line of the first area, while establishes another circle with a second radius, which is centered at the touch position and is greater than the first radius, as anther border line of the second area.

In this connection, the values of the first and the second radiuses and the ratio therebetween may be settable as needed, depending on various kinds of factors, such as the size of the screen (object display area), the arm length of the operator, etc. Further, although the width of the second area is kept constant in the schematic diagrams shown in FIG. 8A and FIG. 8B, it is also applicable that the width of the second area is made to be variable corresponding to the distance to the end portion of the screen, due to the necessity for widely moving the instruction position at the time when the instruction position is located at a position far from the end portion of the screen. Still further, in the schematic diagrams shown in FIG. 8A and FIG. 8B, since the hand-reachable range becomes a circular area with a radius being same as the arm length, the border lines between the areas are respectively defined as the semicircle or the circle. However, the shape of the area concerned is changeable as needed, and for instance, the concerned area may be formed in a rectangular shape, a central point of which is set at such a point that corresponds to the touch position (or a rectangular shape centered with the touch position), or the like.

On the other hand, when determining that the touch interval time is shorter than the predetermined time period (Step S111a; NO), it is impossible to determine whether the touch operation concerned represents the area definition instruction or the operating instruction. Accordingly, the mode determining section 25 determines whether or not the touch position resides within an area other than the first area (or other than both the first area and the second area) previously established (Step S112a), and when determining that the touch position resides within the first area (or the second area) (Step S112a; NO), the mode determining section 25 determines that the touch operation concerned represents the operating instruction within the area concerned (relates to the previous operation) and finalizes the area definition processing. On the other hand, when determining that the touch position resides within an area other than the first area (or other than both the first area and the second area) (Step S112a; YES), the mode determining section 25 determines that the touch operation concerned is the area setting instruction for initiating a new operation, anddefines areas based on the touch position according to the method aforementioned (Step S113a).

<In Case where Area Definition Processing is Performed, Based on Signals (Representing Image Captured by Camera) Sent from Operator Detecting Section 12>

As shown in FIG. 5, the mode determining section 25 acquires the touch interval time from the time managing section 26 and determines whether or not the touch interval time is equal to or longer than the predetermined time period established in advance (Step S111b). When determining that the touch interval time is equal to or greater than the predetermined time period, the mode determining section 25 determines that the touch operation concerned is an instruction for setting an area for a new operation (namely, the current action is nothing to do with the previous action). Then, based on the portrait image of the operator captured by the camera, the operator position determining section 24 specifies the position of the operator relative to the screen of the display operating section 11 and notifies the mode determining section 25 of the operator's position above-specified (Step S113b). Successively, based on the operator's position notified, the mode determining section 25 defines areas according to the method aforementioned (Step S114b).

On the other hand, when determining that the touch interval time is shorter than the predetermined time period (Step S111b; NO), the mode determining section 25 cannot determine whether the touch operation concerned represents the area definition instruction or the operating instruction. Accordingly, the mode determining section 25 determines whether or not the touch position resides within an area other than the first area (or other than both the first area and the second area) previously established (Step S112b), and when determining that the touch position resides within the first area (or the second area) (Step S112b; NO), the mode determining section 25 determines that the touch operation concerned represents the operating instruction within the area concerned (relates to the previous operation) and finalizes the area definition processing. On the other hand, when determining that the touch position resides within an area other than the first area (or other than both the first area and the second area) (Step S112b; YES), the mode determining section 25 determines that the touch operation concerned is an instruction for setting an area for a new operation. Then, based on the portrait image of the operator captured by the camera, the operator position determining section 24 specifies the position of the operator relative to the screen of the display operating section 11 and notifies the mode determining section 25 of the operator's position above-specified (Step S113b). Successively, based on the operator's position notified, the mode determining section 25 defines areas according to the method aforementioned (Step S114b).

Figure 3:
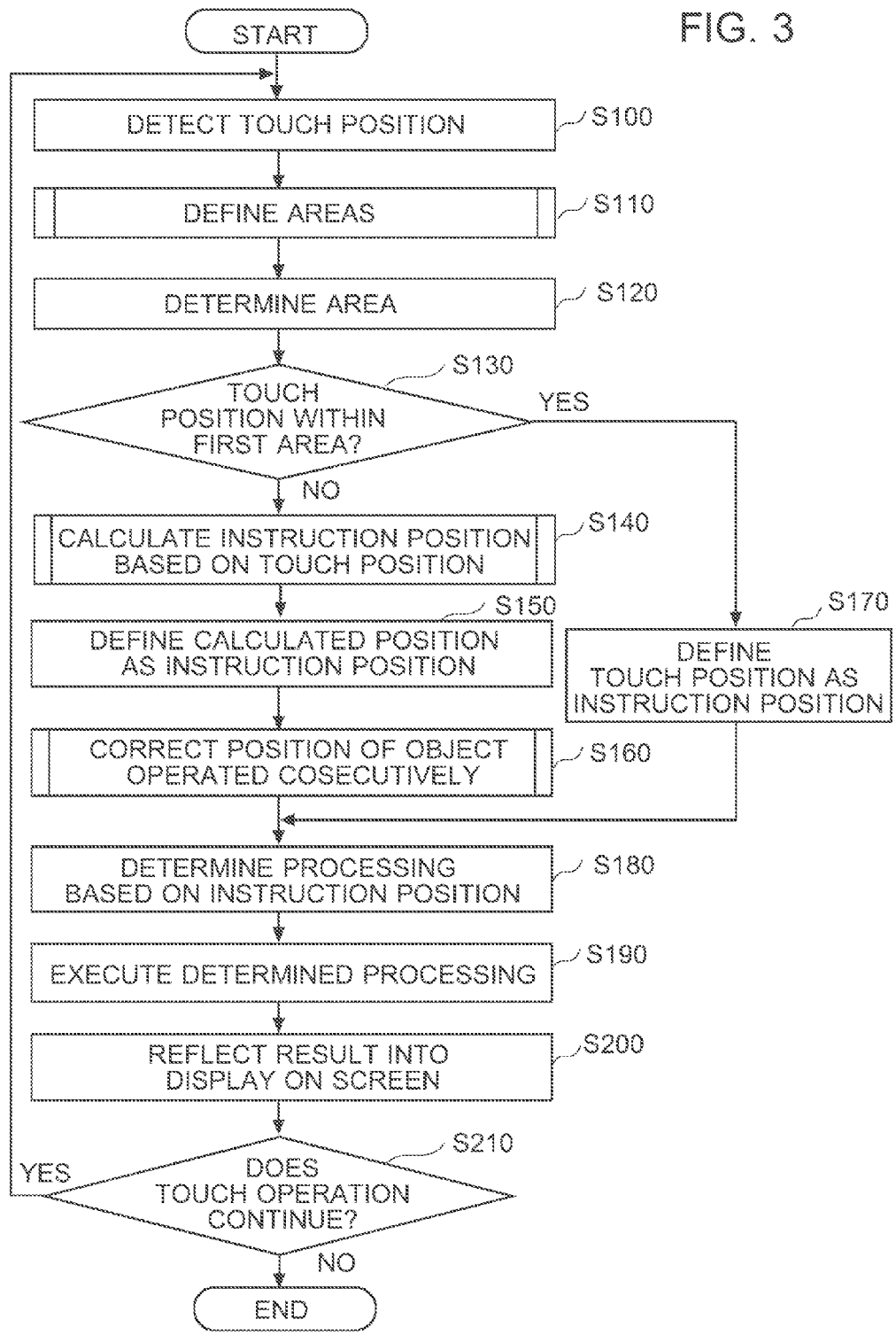
FIG. 3 is a flowchart indicating processing (touch detection processing) to be performed by a control apparatus in accordance with Example 1 of the present invention.

Returning to the flowchart shown in FIG. 3, the mode determining section 25 determines which area the touch position, detected in Step S100, is included in, among the areas defined in Step S110 (Step S120). When determining that the touch position resides within the first area (Step S130; YES), the coordinate converting section (instruction position setting section) 27 defines the touch position as the instruction position as it is. Then, the processing shifts to the operation in Step S180.

On the other hand, when determining that the touch position resides within an area other than the first area (resides within the second area) (Step S130; NO), the coordinate converting section (instruction position setting section) 27 calculates the instruction position based on the touch position (Step S140), so as to define the position above-calculated as the instruction position (Step S150). The flowchart shown in FIG. 6 indicates the details of the instruction-position calculation processing. As indicated, the coordinate converting section (instruction position setting section) 27 calculates the instruction position according to the distance from the boundary between the first area and the second area to the touch position, the other distance from the boundary between the first area and the second area to an end portion of the screen (object display area), etc, (Step S141).

For instance, as shown in FIG. 9A, in a case where the touch position (indicated by the circular white point) resides within the second area, the instruction position (indicated by the triangular white point) is set at such a position to which the touch position is moved from the touch position in the direction towards the end portion of the screen (object display area) along the line extended from the reference point (operator's position) of the area through the touch position. On that occasion, in a case where an interval distance "x1" (shown in FIG. 9A) between the touch position and the boundary is small, an interval distance "y1" (shown in FIG. 9A) between the instruction position and the boundary is made to be relatively small, while in a case where an interval distance "x2" (shown in FIG. 9A) between the touch position and the boundary is large, an interval distance "y2" (shown in FIG. 9A) between the instruction position and the border line is made to be relatively large. Namely, the interval distance between the instruction position and the boundary is made to vary depending on the other interval distance between the touch position and the border line. In this connection, although such a case that the interval distance between the instruction position and the boundary is linearly synchronized with the other interval distance between the touch position and the boundary (namely, the Equation of "y1/x1=y2/x2" is fulfilled) has been exemplified herein, for instance, a non-linear relationship, such as a quadratic function, a cubic function an exponential function, etc., may be employed for synchronizing them with each other.

According to the schematic diagram shown in FIG. 9A, the interval distance between the instruction position and the boundary is kept constant at any angle of inclination, as far as the interval distance between the touch position and the boundary is kept at a constant value. However, due to the necessity for widely moving the instruction position at the time when the touch position is located at a position far from the end portion of the screen, it is also possible to change a degree of space separation (shift amount) of the instruction position from the touch position, corresponding to the distance from the boundary to the end portion of the screen. For instance, as indicated in the schematic diagram shown in FIG. 9B, on the premise that the width of the second area is set at "d", in a case where an interval distance "L1" (shown in FIG. 9B) from the boundary between the first area and the second area to the end portion of the screen is small, an interval distance "y3" (shown in FIG. 9B) between the instruction position and the boundary is made to be relatively small, while in a case where an interval distance "L2" (shown in FIG. 9B) from the boundary to the end portion of the screen is large, an interval distance "y4" (shown in FIG. 9B) between the instruction position and the boundary is made to be relatively large. Namely, the interval distance between the instruction position and the boundary is made to vary depending on the width of the second area and the other interval distance from the boundary to the end portion of the screen. In this connection, although such a case that the interval distance between the instruction position and the boundary is linearly synchronized with the other interval distance between the touch position and the boundary (namely, the Equation of "y3/L1=y4/L2" is fulfilled) has been exemplified herein as well as the above, for instance, a non-linear relationship, such as a quadratic function, a cubic function, an exponential function, etc., may be employed for synchronizing them with each other.

Further, even though the instruction position is to be set by employing the operator's position as the reference point in the present example, since there exists a certain correlation between the touch position and the instruction position, the operator may be able to recognize the correlation concerned. For instance, it is also possible to set the instruction position by employing a certain point, located on the lower end portion of the screen (object display area) (preferably, the lower end portion in the vicinity of the operator, the right-lower end portion in the schematic diagram shown in FIGS. 9A and 9B), as the reference point.

In this connection, the touch position in the second area and the actual instruction position on the object display area are different from each other in the present example. On this reason, for instance, when the operator intends to move a certain object to a predetermined place located outside the second area, the operator cannot precisely recognize what position within the second area he should touch, and as a result, the object concerned is disposed at a wrong position sifted from the predetermined position. In order to overcome the inconvenience as above-mentioned, returning to the flow-chart shown in FIG. 3, the mode determining section 25 conducts the position correction processing for the consecutive operation object, so as to make it possible to adjust the position of the object by consecutively operating the object (Step S160).

The flowchart shown in FIG. 7 indicates a detailed flow of the position correction processing. Initially, based on the information notified from the touch-position and operation detecting section 23, the mode determining section 25 determines whether or not the current touch operation is an initial touch operation, namely, whether or not a no-touch existing status has changed to a touch existing status (Step S161). When determining that the current touch operation is not an initial touch operation (when the touch operation still continues) (Step S161; NO), the mode determining section 25 determines that the current mode is in midcourse of performing a certain operation, and finalizes the position correction processing.

When determining that the current touch operation is an initial touch operation (a no-touch existing status has changed to a touch existing status), based on the information notified from the touch-position and operation detecting section 23, the mode determining section 25 further determines whether or not an interval distance between the current touch position and the position of the end of the last touch operation is within the predetermined range established in advance (Step S162). When determining that the interval distance from the position of the end of the last touch operation exceeds the predetermined range (Step S162; NO), the mode determining section 25 determines that the current touch operation is not one of consecutive operations for the same object, and finalizes the position correction processing.

When determining that the interval distance from the position of the end of the last touch operation is within the predetermined range (Step S162; YES), based on the information notified from the touch-position and operation detecting section 23, the mode determining section 25 still further determines whether or not an operation for the object has been implemented within the predetermined time period just before the touch operation concerned is performed (Step S163). When determining that an operation for the object has not been implemented within the predetermined time period (Step S163; NO), the mode determining section 25 determines that the current touch operation is not one of consecutive operations for the same object, and finalizes the position correction processing. On the other hand, when determining that an operation for the object has been implemented within the predetermined time period (Step S163; YES), the mode determining section 25 determines that the current touch operation is one of consecutive operations for the same object, and accordingly, determines which area the initial touch position is included in. Then, the coordinate converting section (instruction position setting section) 27 converts the coordinate values of the touch position to those of the instruction position corresponding to the area above-determined, so as to implement the operation for correcting the instruction position (Step S164).

Returning again to the flowchart shown in FIG. 3, based on the instruction position, the processing determining section (processing section) 22 determines a kind of processing instructed (Step S180), to execute the determined processing (Step S190). Successively, the image processing section (processing section) 21 creates an image corresponding to the processing (in a case of the object moving operation, an image in which the position of the object is moved), and transmits the image data representing the image to the display operating section 11, so that the display operating section 11 displays the image to reflect the processing thereon (Step S200). After that, the processing determining section 22 determines whether or not the touch operation still continues (Step S210), and when determining that the touch operation still continues, returns to Step S100 to repeat the same processing, while when determining that the touch operation does not continue, finalizes the consecutive processing (END). For instance, when determining that the object exists at the instruction position corresponding to the touch position in the processing from Step S100 to Step S200 at the initial time of the consecutive processing, the processing determining section 22 executes the processing for selecting the object concerned, and then, when determining that the touch position has moved in the processing from Step S100 to Step S200 at the next time, executes the processing for moving the concerned object to the instruction position corresponding to the touch operation performed after moving.

FIG. 10A and FIG. 10B are the schematic diagrams showing an operation controlling method based on the procedure aforementioned. For the convenience of the explanations, the locus of a touch position and the locus of an instruction position are displaced from each other, respectively, in the drawings concerned.

As shown in FIG. 10A, in a case where a movement of a touch position (indicated by the circular white point) is conducted by a distance of "x5" within the first area, the instruction position is set at the touch position as it is in Step S170 shown in FIG. 3. Accordingly, the movement distance "y5" of the instruction position (indicated by the triangular white point) is the same as that of the touch position, namely, equal to the distance "x5". Further, in a case where a movement of a touch position is conducted by a distance of "x6" within the second area, the instruction position is set at the position calculated in Step S140 shown in FIG. 3. Accordingly, the movement distance "y6" of the instruction position is found by enlarging the movement distance of the touch position (a value found by multiplying "x6" by "k").

Further, as shown in FIG. 10B, in a case where a touch position is moved by crossing the boundary between the first area and the second area (moved by a distance of "x7" in the first area and further moved by a distance of "x8" in the second area), with respect to the moving operation within the first area, the instruction position is set at the touch position as it is in Step S170 shown in FIG. 3, while with respect to the movement operation within the second area, the instruction position is set at the position calculated in Step S140 shown in FIG. 3. Accordingly, the movement distance "y" of the instruction position is found by adding the moving distance "x7" in the first area to the value calculated by enlarging the moving distance "x8" in the second area (herein, a value found by multiplying "x8" by "k").

Accordingly, when making the object move within the first area, the operator can move the object to a desired position by touching the object and releasing the object at the desired position as usual. Further, when making the object, currently residing at hand, move to a separate place, the operator can move the object to a desired position residing on a line extended therefrom by touching the object and releasing the object at the desired position residing within the crossover area. Still further, at the second mode, when another touch operation has been conducted within a predetermined area around a touch position of a last touch operation and within a predetermined period after the last touch operation is released, an object at an instruction position corresponding to the touch position of the last touch operation can be moved to an instruction position corresponding to a touch position of the another touch operation. Thereby, even in a case where the position of the object deviates from the normal position, it is possible to correct the position of the object by finely adjusting the touch position, and it is also possible to easily operate the object residing at any place within the object display area by performing the operation being same as that to be performed within the same object display area.

Example 2

Next, referring to the drawings shown in FIG. 11 through FIG. 13B, a control apparatus, an operation controlling method and a non-transitory computer-readable medium storing an operation controlling program, each of which is in accordance with the present example, will be detailed in the following. FIG. 11 and FIG. 12 are the flowcharts indicating the processing to be conducted by the control apparatus in accordance with the present example, while FIG. 13A and FIG. 13B are the explanatory schematic diagrams for explaining relationships between the touch positions and the instruction positions.

Although, in Example 1 aforementioned, the area definition processing is implemented on the basis of the operator's position so that the instruction position is set at a position being the same as the touch position or being different form the touch position, corresponding to which area the touch position belongs to, it is also possible to configure the system in such a manner that the same processing is executed even if the touch operation is performed anywhere on the screen. In this case, although the fundamental configuration of the operation control system is substantially the same as that of Example 1, the mode determining section 25 of the control apparatus 20 conducts controlling operations for determining the operation mode of the control apparatus 20 for setting the instruction position at either the first mode or the second mode, and then, notifying the coordinate converting section 27 of the result above-determined.

Referring to the flowcharts shown in FIG. 11 and FIG. 12, a touch detection processing to be conducted in the operation control system (control apparatus 20), above-configured, will be detailed in the following. In this connection, the CPU, provided in the control apparatus 20, executes the operation control program stored in the ROM so as to achieve the touch detection processing above-mentioned. Further, the display operating section 11 is provided with buttons for selecting the operation mode, etc., so that the operator operates the buttons to establish the operation mode as either the first mode or the second mode.

Initially, based on the signals received from the touch sensor equipped on the display operating section 11 of the display panel 10, the touch-position and operation detecting section 23 detects the touch position (coordinate values) at which the operator has touched the display operating section 11 (Step S300).

Successively, the touch-position and operation detecting section 23 detects the button operating action performed by the operator, and then, notifies the mode determining section 25 of the detected result. Corresponding to the button operating action above-notified, the mode determining section 25 determines the operation mode from between the first mode and the second mode (Step S310). Alternatively, when detecting a specific operation performed by the operator (for instance, a touch operation performed by a plurality of operator's fingers), the touch-position and operation detecting section 23 recognizes that the specific operation represents an instruction for changing the operation mode, and notifies the mode determining section 25 of the specific operation above-recognized, so that the mode determining section 25 determines the operation mode from between the first mode and the second mode, In a case where the operation mode is set at the first mode (Step S320; YES), the coordinate converting section 27 set the instruction position at the touch position (Step S360). Then, the processing proceeds to Step S370.

On the other hand, in a case where the operation mode is set as the second mode (Step S320; NO), the coordinate convening section (indication position setting section) 27 calculates the instruction position based on the touch position (Step S330), so as to define the position above-calculated as the instruction position (Step S340). The flowchart shown in FIG. 12 indicates the details of the instruction-position calculation processing. At first, the coordinate converting section (instruction position setting section) 27 determines whether or not the current touch operation is an initial touch operation, after the operation mode has been changed from the first mode to the second mode (Step S331). In the case of Example 2, since no reference position to be employed for the magnifying operation exists, due to the lack of the separated areas, as for the initial touch operation, the touch position thereof is set as the reference position for calculating the instruction position (Step S332), and, based on the distance from the reference position above-established, the instruction position is calculated according to the method being substantially same as that employed for Example 1 (Step S333).

In this connection, the touch position at the second mode and the actual instruction position on the object display area are different from each other even in Example 2. On this reason, when the operator intends to move a certain object to a predetermined place, the operator cannot precisely recognize how to move the touch position, and as a result, the object concerned is disposed at a wrong position sifted from the predetermined position. In order to overcome the inconvenience as above-mentioned, the mode determining section 25 conducts the position correction processing for the consecutive operating object (Step S350), so as to make it possible to adjust the position of the object by making it possible to consecutively operate the object. Since the position correction processing, above-mentioned, is substantially the same as that of Example 1 shown in FIG. 7, the detailed explanations thereof will be omitted hereinafter.

Successively returning to the flowchart shown in FIG. 11, based on the instruction position, the processing determining section 22 determines a kind of processing (Step S370), and executes the processing above-determined (Step S380). Then, the image processing section 21 creates image data representing an image that corresponds to the processing (in a case of the object moving operation, an image in which the position of the object is moved), and transmits the created image data to the display operating section 11, which displays the image thereon so as to reflects the processing (Step S390). After that, the processing determining section 22 determines whether or not the touching operation continues (Step S400). When determining that the touching operation still continues, the processing determining section 22 returns to Step S300 to repeat the same processing, while when determining that the touching operation does not continue, finalizes the consecutive processing.

FIG. 13A and FIG. 13B are schematic diagrams showing the operation controlling method based on the above-mentioned procedure. For convenience of the explanations, the locus of a touch position and the locus of an instruction positions are shifted from each other, respectively, in the drawings concerned.

As shown in FIG. 13A, in a case where the touch position (indicated by the circular white point) is moved by a distance of "x1" (or "x2") in the first mode, the instruction position is set at the touch position as it is in Step S360 shown in FIG. 11. Accordingly, the moving distance "y1" (or "y2") of the instruction position (indicated by the triangular white point) is the same as that of the touch position, namely, equal to the distance "x1" (or "x2").

On the other hand, as shown in FIG. 13B, in a case where the touch position is moved by a distance of "x1" (or "x2") in the second mode, the instruction position is set at the position calculated in Step S330 shown in FIG. 11, in Step S340. Accordingly, the movement distance "y1" (or "y2") of the instruction position is found as the value calculated by enlarging the movement distance of the touch position (herein, a value found by multiplying "x1" by "2" or a value found by multiplying "x2" by "2").

Accordingly, when operating the object as usual, the operator may set the current operating mode at the first mode, while when the operator intends to move the object, currently residing at hand, to a distant position, or intends to operate the object currently residing at a hand-unreachable position, the operator may set the current operating mode at the second mode. Therefore, it becomes possible to easily operate the object residing at any place within the object display area by performing the operation being same as that to be performed within the same object display area.

Example 3

Next, referring to the drawings shown in FIG. 14 through FIG. 16B, a control apparatus, an operation controlling method and a non-transitory computer-readable medium storing an operation controlling program, each of which is in accordance with the present example, will be detailed in the following. FIG. 14 and FIG. 15 are the flowcharts indicating the processing to be conducted by the control apparatus in accordance with the present example, while FIG. 16A and FIG. 16B are the explanatory schematic diagrams for explaining relationships between the touch positions and the instruction positions.

In Example 1 aforementioned, the moving range of the touch position in the second area is converted to the other moving range of the instruction position by magnifying (enlarging) the moving range of the touch position, and in Example 2 aforementioned, the moving range of the touch position in the second mode is converted to the other moving range of the instruction position by magnifying (enlarging) the moving range of the touch position. Alternatively, in a case where plural movements of a touch position are conducted, it is also possible to accumulate the plural moving ranges, corresponding to the plural movements, so as to obtain the total moving range of the instruction position.

Referring to the flowchart shown in FIG. 14, the touch detection processing to be conducted by the control apparatus 20 in the above-mentioned case will be detailed in the following. In this connection, in order to implement the concerned touch detection processing, the CPU, included in the control apparatus 20, executes the operation controlling program stored in the ROM.

Initially, based on the signals received from the touch sensor mounted over the display operating section 11 of the display panel 10, the touch-position and operation detecting section 23 detects a position (coordinate values) onto which the operator touched the display operating section 11 (Step S500).

Successively, the mode determining section 25 acquires the touch interval time from the time managing section 26, and determines whether or not the predetermined time period, established in advance, has elapsed after the end of the last touching operation, in other words, whether or not another movement of a touch position having been conducted again within a predetermined time period after a last movement of a touch position (Step S510). When determining that the predetermined time period has elapsed (Step S510; YES), the concerned operation can he regarded as a new operation having nothing to do with the last touching operation. Accordingly, the coordinate converting section 27 defines the touch position, detected in Step S500, as the instruction position (Step S520). Namely, the coordinate converting section 27 executes the controlling operation same as that implemented in the first mode of the Example 2 aforementioned.

On the other hand, when determining that the predetermined time period has elapsed (Step S510; NO), the concerned action can be regarded as an operation related to the last touching operation. Accordingly, based on the information detected by the touch-position and operation detecting section 23 and notified from the mode determining section 25, the coordinate converting section 27 detects the movement direction and the movement amount of the touch position concerned, so as to shift the instruction position in the detected direction by the detected amount. Namely, the coordinate converting section 27 defines a position, being different from the touch position, as the instruction position, as defined in the second mode of the Example 2.

Still successively, based on the instruction position, the processing determining section 22 determines a kind of processing (Step S550), and implements the processing determined in Step S550 (Step S560). Then, the image processing section 21 creates image data representing an image that corresponds to the processing (in a case of the object moving operation, an image in which the position of the object is moved), and transmits the created image data to the display operating section 11, which displays the image thereon so as to reflects the processing (Step S570). After that, the processing determining section 22 determines whether or not the touching operation continues (Step S580). When determining that the touching operation still continues, the processing determining section 22 returns to Step S500 to repeat the same processing, while when determining that the touching operation does not continue, finalizes the consecutive processing.

In this connection, although it is determined in Step S510 whether or not the predetermined time period has elapsed since the last touching operation was completed, it is also possible to revise the flowchart, shown in FIG. 14, so as to shift the instruction position in the movement direction of the touch position by the movement amount thereof, every time when the touch position has moved, without executing the determining operation above-mentioned. In that case, the flowchart shown in FIG. 14 may be revised to new one as shown in FIG. 15 by omitting the Step S510 and Step S520 therefrom.

FIG. 16A and FIG. 16B are schematic diagrams showing the operation controlling method based on the above-mentioned procedure. Specifically, FIG. 16A shows a mode of the instruction position, which corresponds to the initial moving operation of a touch position, while FIG. 16B shows a mode of the other instruction positions, which correspond to moving operations of a touch position, performed at the second time and the later times.

At first, as shown in FIG. 16A, in a case where the touch position (indicated by the circular white point) is moved by a distance of "x1" so as to move it to position "m1", the instruction position (indicated by the triangular white point) is also moved in the moving direction same as that of the touch position by the distance of "y1" same as that of the touch position, so as to move it to position "n1". Successively in the above state, as shown in FIG. 16B, in a case where another movement of an touch position is conducted by a distance of "x2" so as to move it from an arbitrarily selected position to position "m2", the instruction position is also shifted in the movement direction same as that of the touch position by the distance of "y2" same as that of the touch position starting from the instruction position "n1" set after the previous movement, which is the current reference position, so as to move it to position "n2". Still successively, in a case where another movement of a touch position is conducted by a distance of "x3" so as to move it from another arbitrarily selected position to position "m3", the instruction position is also shifted in the moving direction same as that of the touch position by the distance of "y3" same as that of the touch position starting from the instruction position "n2" set after the previous movement, which is the current reference position, so as to move it to position "n3".

Accordingly, when the operator intends to move the object, currently residing at hand, to a distant position, or intends to operate the object currently residing at a hand-unreachable position, by establishing an arbitrarily selected position as the current reference position, the operator may conduct plural moving operation of a touch position, as if he were operating a mouse. Therefore, it becomes possible to easily operate the object residing at any place within the object display area by performing the operation being same as that to be performed within the same object display area.

Incidentally, the scope of the present invention is not limited to the aforementioned examples of the present invention. The configuration and/or the operation controlling method in regard to the display panel 10 and the control apparatus 20 can be varied as needed by a skilled person without departing from the spirit and scope of the invention.

For instance, although only the second area, serving as the magnification variable area, is provided within the peripheral area surrounding the first area, serving as the same magnification area, in Example 1, it is also applicable that the magnification variable area is constituted by a plurality of areas, for instance, such that a third area, whose coordinate-conversion magnification factor is greater than that of the second area, may be further provided in a peripheral area surrounding the second area, or the like.

Further, in Example 1, the first area in which the instruction position is set at the touch position as it is, and the second area in which the instruction position is set at the position, to which the touch position is moved towards the end portion of the screen, are provided in the object display area. Still further, in Example 2, the first mode in which the instruction position is set at the instruction position as it is, and the second mode in which the instruction position is set at the position, to which the touch position is moved towards the end portion of the screen, are provided as the operation modes in the object display area. Yet further, in Example 3, the instruction position is defined by sequentially accumulating the locus of the touch position one by one. However, it is needless to say that it may be possible to combine the above-exemplified examples with each other so as to create a system more effective than ever without departing from the spirit and scope of the invention.

For instance, by combining Example 1 and Example 2, it is possible to configure such a system in which, in a case where the operator touches a position residing within the second area at the time when the operating mode is net at the second mode, a position to which the operator moves the touch position towards the end portion of the screen is defined as the instruction position. Alternatively, by combining Example 2 and Example 3, it is also possible to configure such a system that makes it possible to select any one of: the first mode in which the touch position is defined as the instruction position as it is; the second mode in which the position, to which the touch position is moved towards the end portion of the screen, is defined as the instruction position; and the third mode in which the instruction position is defined by sequentially accumulating the locus of the touch position one by one, as the current operating mode. Still alternatively, by combining Example 1 and Example 3, it is also possible to configure such a system in which the instruction position is defined by sequentially accumulating the locus of the touch position one by one in the first area and the second area.

The invention claimed is:

1. A control apparatus for controlling a display panel which allows an operator to give an instruction for object processing at an instruction position in an object display area of the display panel by performing a touch operation in the object display area, the control apparatus comprising:
    an instruction position setting section configured to perform setting an instruction position of an instruction for object processing given by an operator, based on a touch position where a touch operation has been performed in the object display area, the setting the instruction position including setting the instruction position at one of a same position as the touch position and a position being apart from the touch position;
    a mode determining section is configured to perform determining a mode for setting the instruction position, the determining the mode including
        defining a first area covering a predetermined range in the object display area and a second area surrounding the first area and
        choosing between a first mode to set the instruction position at the same position as the touch position and a second mode to set the instruction position at a position being away from the touch position, according to which of the first area and the second area includes the touch position, the first area being an area where the instruction position is set at the first mode, the second area being an area where the instruction position is set at the second mode; and
    a processing section configured to execute the object processing according to the instruction position.

2. The control apparatus of claim 1,
    wherein the instruction setting section is configured to, on the touch position being moved at the second mode, shift the instruction position by using an enlarged movement amount of the touch position.

3. The control apparatus of claim 1,
wherein the mode determining section is configured to set the predetermined range on a basis of a position of the operator determined based on a touch position at which a predetermined touch operation has been performed.

4. The control apparatus of claim 3,
wherein the mode determining section is configured to define the first area and the second area within reach of the operator, the reach being calculated by positions of both shoulders of the operator and a length of an arm of the operator.

5. The control apparatus of claim 1,
wherein the mode determining section is configured to set the predetermined range on a basis of a position of the operator determined based on information Obtained from a detector previously put in the display panel.

6. The control apparatus of claim 5,
wherein the mode determining section is configured to define the first area and the second area within reach of the operator, the reach being calculated by positions of both shoulders of the operator and a length of an arm of the operator.

7. The control apparatus of claim 1,
wherein the instruction position setting section is configured to, on the touch position being within the second area, shift the instruction position from the touch position in a direction toward an end of the object display area, according to a distance from a boundary between the first area and the second area to the touch position.

8. The control apparatus of claim 7,
wherein the instruction position setting section is configured to change a shift amount of the instruction position from the touch position according to a distance from the boundary between the first area and the second area to an end of the object display area compared with a width of the second area.

9. The control apparatus of claim 1,
wherein the mode determining setting section is configured to operate the display panel to display at least one of the first area and the second area in the object display area discernibly.

10. The control apparatus of claim 1,
wherein the instruction position setting section is configured to, on another touch operation having been conducted within a predetermined area around a touch position of a last touch operation and within a predetermined period after the last touch operation is released, at the second mode, move an object at an instruction position corresponding to the touch position of the last touch operation to an instruction position corresponding to a touch position of the another touch operation.

11. The control apparatus of claim 1,
wherein the instruction position setting section is configured to, on a plurality of movements of a touch position having been conducted, set the instruction position by accumulating the plurality of the movements.

12. The control apparatus of claim 11,
wherein the instruction position setting section is configured to, on another movement of a touch position having been conducted again within a predetermined period after a last movement of a touch position, set the instruction position at a position shifted by an amount of the another movement from an instruction position set after the last movement has been conducted.

13. An operation controlling method of a control apparatus for controlling a display panel which allows an operator to give an instruction for object processing at an instruction position in an object display area of the display panel by performing a touch operation in the object display area, the method comprising:
setting an instruction position of an instruction for object processing given by an operator, based on a touch position where a touch operation has been performed in the object display area, the setting the instruction position including setting the instruction position at one of a same position as the touch position and a position being apart from the touch position;
determining a mode for setting the instruction position, the determining the mode including
defining a first area covering a predetermined range in the object display area and a second area surrounding the first area and
choosing between a first mode to set the instruction position at the same position as the touch position and a second mode to set the instruction position at a position being away from the touch position, according to which of the first area and the second area includes the touch position, the first area being an area where the instruction position is set at the first mode, the second area being an area where the instruction position is set at the second mode; and
executing the object processing according to the instruction position.

14. The operation controlling method of claim 13,
wherein the setting the instruction position includes, on the touch position being moved at the second mode, shifting the instruction position by using an enlarged movement amount of the touch position.

15. The operation controlling method of claim 13,
wherein the determining the mode includes determining a position of the operator based on a touch position at which a predetermined touch operation has been performed, and setting the predetermined range on a basis of the position of the operator.

16. The operation controlling method of claim 15,
wherein the determining the mode includes defining the first area and the second area within reach of the operator, the reach being calculated by positions of both shoulders of the operator and a length of an arm of the operator.

17. The operation controlling method of claim 13,
wherein the determining the mode includes determining a position of the operator based on information obtained from a detector previously put in the display panel, and setting the predetermined range on a basis of the position of the operator.

18. The operation controlling method of claim 17,
wherein the determining the mode includes defining the first area and the second area within reach of the operator, the reach being calculated by positions of both shoulders of the operator and a length of an arm of the operator.

19. The operation controlling method of claim 13,
wherein the setting the instruction position includes, on the touch position being within the second area, shifting the instruction position from the touch position in a direction toward an end of the object display area, according to a distance from a boundary between the first area and the second area to the touch position.

20. The operation controlling method of claim 19,
wherein the setting the instruction position includes changing a shift amount of the instruction position from the touch position according to a distance from the boundary between the first area and the second area to an end of the object display area compared with a width of the second area.

21. The operation controlling method of claim 13,
wherein the determining the mode includes operating the display panel to display at least one of the first area and the second area in the object display area discernibly.

22. The operation controlling method of claim 13,
wherein the setting the instruction position includes, on another touch operation having been conducted within a predetermined area around a touch position of a last touch operation and within a predetermined period after the last touch operation is released, at the second mode, moving an object at an instruction position corresponding to the touch position of the last touch operation to an instruction position corresponding to a touch position of the another touch operation.

23. The operation controlling method of claim 13,
wherein the setting the instruction position includes, on a plurality of movements of a touch position having been conducted, setting the instruction position by accumulating the plurality of the movements.

24. The operation controlling method of claim 23,
wherein the setting the instruction position includes, on another movement of a touch position having been conducted again within a predetermined period after a last movement of a touch position, setting the instruction position at a position shifted by an amount of the another movement from an instruction position set after the last movement has been conducted.

25. A non-transitory computer-readable storage medium storing an operation controlling program to be executed in a control apparatus capable of controlling a display panel which allows an operator to give an instruction for object processing at an instruction position in an object display area of the display panel by performing a touch operation in the object display area, the operation controlling program, when being executed by a processor of the control apparatus, causing the control apparatus to perform the operation controlling method of claim 13.

* * * * *